(12) United States Patent
Govyadinov et al.

(10) Patent No.: US 12,270,827 B2
(45) Date of Patent: Apr. 8, 2025

(54) ACTIVE BIMODAL AFM OPERATION FOR MEASUREMENTS OF OPTICAL INTERACTION

(71) Applicant: Attocube Systems AG, Haar (DE)

(72) Inventors: Alexander A. Govyadinov, Haar (DE); Florian Huth, Haar (DE); Ivan Malovichko, Haar (DE); Marcus Diem, Haar (DE)

(73) Assignee: ATTOCUBE SYSTEMS AG, Haar (DE)

( * ) Notice: Subject to any disclaimer, the term of this patent is extended or adjusted under 35 U.S.C. 154(b) by 114 days.

(21) Appl. No.: 17/602,261

(22) PCT Filed: Apr. 9, 2020

(86) PCT No.: PCT/EP2020/060132
§ 371 (c)(1),
(2) Date: Oct. 7, 2021

(87) PCT Pub. No.: WO2020/208133
PCT Pub. Date: Oct. 15, 2020

(65) Prior Publication Data
US 2022/0163559 A1  May 26, 2022

(30) Foreign Application Priority Data
Apr. 12, 2019 (EP) .................................. 19168958

(51) Int. Cl.
*G01Q 60/34* (2010.01)
*G01Q 30/02* (2010.01)
(Continued)

(52) U.S. Cl.
CPC ............. *G01Q 60/34* (2013.01); *G01Q 30/02* (2013.01); *G01Q 60/30* (2013.01); *G01Q 60/363* (2013.01); *G01Q 60/38* (2013.01)

(58) Field of Classification Search
CPC .......... G01D 5/285; G01D 5/264; G01D 5/26; G01D 5/30; G01D 5/305; G02D 26/00;
(Continued)

(56) References Cited

U.S. PATENT DOCUMENTS 8,904,561 B2 * 12/2014 Wickramasinghe ... G01Q 30/02
850/30
9,134,341 B2   9/2015 Prater et al.
(Continued)

OTHER PUBLICATIONS

Elena T. Herruzo et al: "Fast nanomechanical spectroscopy of soft matter", Nature Communications, Commun 5, 3126 (2014). https://doi.org/10.1038/ncomms4126, pp. 1-8—Exhibit 2.
(Continued)

*Primary Examiner* — John R Lee
(74) *Attorney, Agent, or Firm* — ADRIANO & ASSOCIATES

(57) ABSTRACT

The present invention relates to a method for measuring the dielectric properties of a sample with a scanning probe microscope. In particular, the invention relates to highly-localized optical imaging and spectroscopy on a sample surface using an atomic force microscope (AFM) probe mechanically driven at two oscillation frequencies, referred to herein as "active bimodal operation", and a modulated source of electromagnetic radiation.

17 Claims, 11 Drawing Sheets

(51) Int. Cl.
*G01Q 60/30* (2010.01)
*G01Q 60/36* (2010.01)
*G01Q 60/38* (2010.01)

(58) Field of Classification Search
CPC ...... G02D 26/001; G01Q 60/00; G01Q 30/00; G01Q 30/02; G01Q 60/363; G01Q 60/36; G01Q 60/42; G01Q 60/38; G01Q 60/26; G01Q 60/28; G01Q 60/30; G01Q 60/32; G01Q 60/34
See application file for complete search history.

(56) References Cited

U.S. PATENT DOCUMENTS

| | | | | |
|---|---|---|---|---|
| 9,395,388 | B2* | 7/2016 | Wu | G01Q 60/02 |
| 9,453,857 | B2* | 9/2016 | Proksch | G01Q 10/04 |
| 9,841,436 | B2* | 12/2017 | Proksch | G01Q 20/00 |
| 9,891,246 | B2* | 2/2018 | Serry | G01Q 60/32 |
| 10,775,405 | B2* | 9/2020 | Sadeghian Marnani | G01N 29/0681 |
| 11,112,426 | B2* | 9/2021 | Fantner | G01Q 60/32 |
| 11,635,449 | B2* | 4/2023 | Osechinskiy | G01Q 10/06 850/1 |
| 2009/0013770 | A1* | 1/2009 | Proksch | G01Q 60/32 73/105 |
| 2009/0064771 | A1* | 3/2009 | Dick | G01Q 60/34 73/105 |
| 2012/0204296 | A1* | 8/2012 | Prater | G01N 21/3563 850/6 |
| 2012/0313697 | A1* | 12/2012 | Hafizovic | H03D 1/22 329/323 |
| 2013/0018623 | A1* | 1/2013 | Sokolov | G01N 3/32 702/113 |
| 2015/0089693 | A1* | 3/2015 | Jesse | G01Q 60/38 850/1 |
| 2017/0038410 | A1* | 2/2017 | Serry | G01Q 60/32 |
| 2017/0299628 | A1* | 10/2017 | Proksch | G01Q 10/00 |
| 2018/0106830 | A1* | 4/2018 | Fantner | G01Q 20/02 |
| 2021/0088392 | A1* | 3/2021 | Kagan | G01L 1/24 |
| 2022/0163559 | A1* | 5/2022 | Govyadinov | G01Q 60/38 |

OTHER PUBLICATIONS

Dana C. Kohlgraf-Owens et al: "Multi-frenquency near-field scanning optical microscopy", Nanotechnology. Jan. 24, 2014; pp. 1-6; 25(3):035203. doi: 10.1088/0957-4484/25/3/035203. Epub Dec. 17, 2013. PMID: 24346240.—Exhibit 3.

* cited by examiner a)

b)

PiFM contrast a)

b)

ACTIVE BIMODAL AFM OPERATION FOR MEASUREMENTS OF OPTICAL INTERACTION

This subject application claims priority under 35 U.S.C, § 371 to PCT Application No. PCT/EP2020/060132, filed Apr. 9, 2020, which claims the benefit of European Patent Application 19168958.7, filed Apr. 12, 2019. The contents of these applications are incorporated by reference in their entireties here.

The present invention relates to a method for measuring the dielectric properties of a sample with a scanning probe microscope. In particular, the invention relates to highly-localized optical imaging and spectroscopy on a sample surface using an atomic force microscope (AFM) probe mechanically driven at two oscillation frequencies, referred to herein as "active bimodal operation", and a modulated source of electromagnetic radiation.

BACKGROUND OF THE INVENTION

Infrared (IR) spectroscopy and microscopy are powerful analytical tools utilized in many disciplines such as materials and life sciences. IR spectroscopy collects IR spectra of studied materials and is able in many cases to identify the chemical composition of an unknown sample according to acquired spectral signatures that are unique to specific materials or chemical bonds. IR spectroscopy is normally performed on bulk samples and yields no spatially-resolved information. Infrared microscopy collects spatially-resolved image of a sample at a selected illumination wavelength and is capable of differentiating and spatially mapping the sample constituents. However, due to the diffraction limit the resolution of conventional IR spectroscopy and microscopy is on the wavelength scale, i.e. micrometer or higher. It would be highly beneficial to perform IR microscopy and spectroscopy on a highly-localized scale down to tens of nanometers to provide nanoscale-resolved information on the sample composition, such as location of different materials, complexes and molecular structures.

Several families of techniques have been proposed to bring the spatial resolution of IR spectroscopy and microscopy onto the nanometer scale. One of these families, which this invention belongs to, is based on detecting the mechanical response of the AFM probe induced by the sample subjected to the external IR illumination. The first relevant technique in this family is referred to as Photo-Thermal Induced Resonance (PTIR), also known as AFM-IR. PTIR principles are described in (Dazzi, Prazeres, Glotin, & Ortega, 2005) and in the U.S. Pat. Nos. 8,001,830 and 8,402,819, which are included herein by reference. PTIR principle of operation can be summarized as measuring the thermal expansion of a sample subjected to a pulsed external IR illumination by detecting a mechanical response of an AFM probe placed into static contact with the sample surface. While demonstrating superior spatial resolution compared to conventional IR techniques, the measured interaction in PTIR is not limited to the area directly below the probe tip. Both the heating of the sample around tip and air below the cantilever contribute to the AFM probe excitation and thus delocalize the probe-sample interaction. Therefore, the spatial resolution of PTIR is limited to the scale of hundreds of nanometers, making it incapable of achieving the truly nanoscale resolution.

WO 2012021727A2 of Wickramasinghe et al. discloses another AFM-based technique that is capable of performing IR microscopy with nanoscale spatial resolution referred to as Photo-induced Force Microscopy (PiFM) (see also Rajapaksa et al. 2010). PiFM principles can be summarized as follows. PiFM operates in a "tapping" mode (non-contact or intermittent contact) in which the cantilever is driven to oscillate at a mechanical frequency $f_1$ close to one of the mechanical resonances of the cantilever $f_{C1}$ (see FIG. 1a). The sample is subjected to an external IR illumination that is modulated at a frequency $f_m$. Optical interaction between the AFM probe and the sample (attributed to optical forces as taught by Wickramasinghe) results in a nonlinear mixing of the illumination modulation frequency with the driving frequency, creating sidebands in the cantilever oscillation response. Therefore, the mechanical oscillation amplitude (further called PiFM amplitude or PiFM signal) at one of these sidebands $f_2=f_1+f_m$ depends on the optical probe-sample interaction. It thus contains information about the dielectric properties of the sample and could be utilized for IR microscopy and spectroscopy, as taught by Wickramasinghe. Importantly in PiFM $f_2$ is chosen to be close to another mechanical resonance of the cantilever $f_{C2}$, which provides resonant enhancement of the cantilever response to a weak optical interaction. Nonlinear mixing ensures that the cantilever response is insensitive to any background (thermal or other) occurring at the modulation frequency $f_m$, which localizes the measurements to the nanoscale.

In U.S. Pat. No. 9,134,341 B2, Prater and Kjoller point out that PiFM implementation as taught by Wickramasinghe is impractical for IR spectroscopy in a large frequency bandwidth since it would require a tunability of the IR source modulation frequency from 250 kHz to 6 MHz across the whole optical spectrum. However, no such single modulator currently exists. They therefore suggest an alternative technique referred to as Multiple Modulation Heterodyne (MMH) infrared spectroscopy. According to this technique, the probe tip is driven at two frequencies $f_1$ and $f_2$, one of which is close to a one mechanical resonance of the cantilever $f_{C1}$. The second frequency is chosen in such a way that $f_2=f_m+f_{C2}$, where $f_m$ is the modulation frequency of the external IR illumination. This way, one can fix $f_m$ and tune $f_2$ in order to compensate for the insufficient or unavailable tunability of the optical modulator. Importantly for the MMH spectroscopy technique, the second driving frequency is chosen such that $f_2$ does not directly excite the second cantilever resonance (i.e. $f_2$ is outside the full width of the cantilever resonance at $f_{C2}$).

While both PiFM and MMH techniques show the capability to perform highly-localized IR spectroscopy, they suffer from undesirable effects. Namely, the measured signal depends critically on the resonant mechanical enhancement $L_{C2}$ provided by the cantilever and drops rapidly when being off resonance $f_{C2}$. The $f_{C2}$ is not constant but depends (primarily) on the mechanical interaction between the AFM probe and the sample (see (Jahng et al., 2014), Eq. (27) that gives an approximate expression for $f_{C2}$). This results in the variation of the resonant enhancement $L_{C2}$ depending on the mechanical properties (stiffness, adhesion, etc.) of the material under the tip and, most importantly, on the experimental parameters used for measurements, such as setpoint (i.e. a relative decrease of the actual tapping amplitude vs. free tapping set by a user)), cantilever stiffness, etc. Such dependence on the setup mechanics is rather strong due to high quality factors (and therefore small resonance widths) of the cantilever resonance needed for efficient detection of weak optical interaction. Therefore, it is nearly impossible to directly compare data obtained in different PiFM or MMH setups or even in the same setup but with different measurement parameters. This is illustrated in FIG. 2, which shows that for a particular detection frequency $f_2$ (vertical dashed line) a material A (darker curves) can be darker (lower PiFM amplitude, FIG. 2a) or brighter (higher PiFM amplitude, FIG. 2b) than a material B (brighter curves) simply due to different setpoints. That is, the contrast between two materials in PiFM strongly depends on the experimental parameters, which has also been observed experimentally (see Ambrosio et al. 2017).

In both PiFM and MMH techniques the cantilever oscillation amplitude is monitored as a measure of the optical interaction between the probe and the sample. This amplitude is insensitive to the sign of the interaction force, i.e. it is impossible to differentiate between attractive and repulsive interactions (see FIG. 3a). This sign is rather encoded in the mechanical phase of the cantilever oscillation. However, the stability of phase detection in AFM directly relates to and depends on the cantilever oscillation amplitude at the selected lock-in frequency ($f_2$ in the present case). Since in PiFM this amplitude scales with the optical interaction, the reliable phase detection is impossible when the optical interaction is small (typical for dielectric materials with an illumination outside their absorption bands) or when the mechanical properties of the sample vary spatially or temporally (which causes the shift of the cantilever resonance as discussed before). The unavailability of reliable phase measurements has a particularly negative implication for PiFM-based spectroscopy by potentially distorting the spectral line shape compared to the surface response function, $\beta$, that defines the optical interaction (FIG. 3b), and thus makes quantitative optical studies practicably impossible.

The problem addressed in the present application is therefore the provision of a method for reliable measurement of optical properties of a sample via scanning probe microscopy, which does not show the above described drawbacks of the prior art methods, in particular provides optical properties of a sample irrespective of the setup mechanics and is capable of differentiating attractive and repulsive interactions.

BRIEF SUMMARY OF THE INVENTION

The present invention relates to a method for measuring the dielectric properties of a sample with a scanning probe microscope comprising an oscillating cantilever probe, a sample and a source of electromagnetic radiation, which method comprises the steps of
  a) inducing oscillations of the cantilever at at least two frequencies $f_1$ and $f_2$, wherein $f_1$ is within the full width of the mechanical oscillation resonance frequency $f_{C1}$ of the cantilever and $f_2$ is within the full width of the mechanical oscillation resonance frequency $f_{C2}$ of the cantilever;
  b) interacting the probe with the sample;
  c) illuminating the probe or a region of the sample including the area of contact with the probe with the electromagnetic radiation at a modulation frequency $f_m$; and
  d) measuring a change in the mechanical oscillation resonance frequencies of the cantilever $f_{C1}$ or $f_{C2}$, due to the modulated radiation at the modulation frequency $f_m$, in order to determine the dielectric properties of the sample.

In an alternative embodiment, the present invention relates to a method for measuring the dielectric properties of a sample with a scanning probe microscope comprising an oscillating cantilever probe, a sample and a source of electromagnetic radiation, which method comprises the steps of
  a) inducing oscillations of the cantilever at at least one frequency $f_1$ that is within the full width of the mechanical oscillation resonance frequency $f_{C1}$ of the cantilever;
  b) interacting the probe with the sample;
  c) illuminating the probe or a region of the sample including the area of contact with the probe with the electromagnetic radiation at a modulation frequency $f_m$; and
  d) measuring a change in the mechanical oscillation resonance frequency $f_{C2}$ of the cantilever, due to the modulated radiation at the modulation frequency $f_m$, in order to determine dielectric properties of the sample,
wherein the cantilever exhibits oscillation resonance frequencies $f_{C1}$ and $f_{C2}$ such that at least for one integer n, the frequency $n*f_{C1}$ falls within the full width of the mechanical oscillation resonance frequency $f_{C2}$.

DETAILED DESCRIPTION OF THE INVENTION

The invention relates to a method of obtaining nanoscale-resolved measurements of optical properties of a sample with an oscillating probe of an AFM microscope and a source of modulated electromagnetic radiation. The invention is based on the finding that by detecting a shift in one or more mechanical resonances of the probe, preferably by monitoring the probe's mechanical phase, while using modulated irradiation of the sample, a reliable measurement of optical properties of the sample becomes possible irrespective of the setup mechanics.

The scanning probe microscope used in the methods of the invention comprises an oscillating cantilever probe, a sample and a source of electromagnetic radiation. Suitable systems are known in the art, e.g. from US 2012/0204296 A1, which is enclosed herein by reference.

Figure 1:
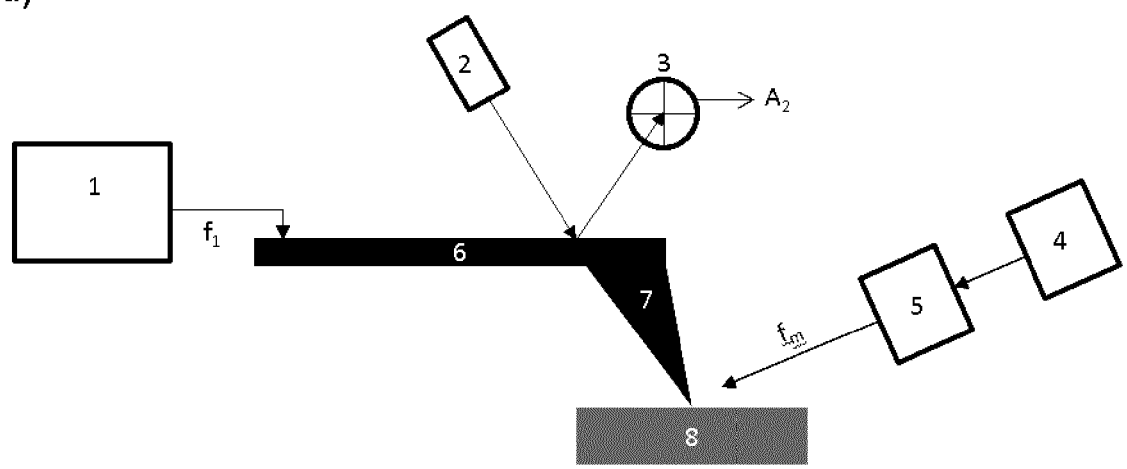
FIG. 1 shows schematic setups for a) PiFM and b) Active Bimodal AFM.
Figure 1:
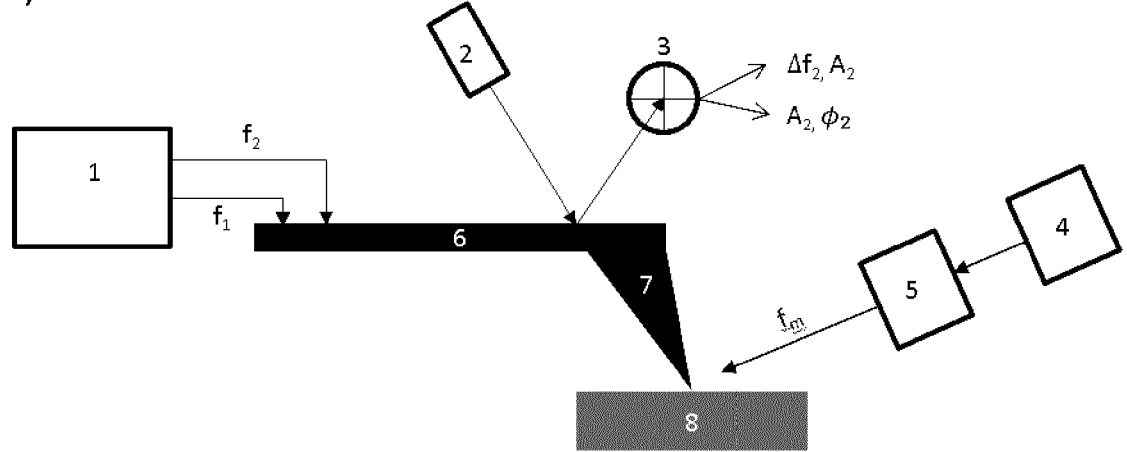

The measurement is preferably conducted by scanning (scan-probing) the specimen with the probe while measuring the interaction between the probe, in particular the tip of the probe, and the specimen by detecting the change in the cantilever movement, e.g. the change in oscillation when using tapping mode, during scanning. As shown in FIG. 1, a) and b), a driving piezo 1 induces oscillations of the cantilever 6, which carries the tip 7 at one end. The movement of the cantilever is detected by measuring the reflection of a laser 2 on the detector 3, which measurement gives the amplitude $A_2$ and phase $\phi_2$ (FIG. 1 b) only) of the cantilever oscillation. Modulated irradiation of the sample 8 with a modulation frequency $f_m$ is provided by a radiation source 4 via the radiation modulator 5.

Probes to be used in the method according to the present invention are probes comprising a cantilever and a tip, which are known in the art for AFM or for scanning near-field optical microscopy (SNOM). These probes typically comprise a cantilever which carries the tip on one of its ends, the other end of the cantilever is typically mounted onto a larger base to simplify mounting and replacement of the tip. The radius of curvature of the tip is typically below about 100 nm, preferably below about 50 nm, most preferably below about 20 nm. The tips of the cantilevers may be metalized. Suitable probes are commercially available, e.g. from nanoSensors™ or MikroMasch.

In a preferred embodiment cantilevered probes are used. In an alternative embodiment a tuning fork, preferably oscillating vertically or in sheer force mode, could be utilized as probe. In yet another embodiment a hybrid technology where a cantilevered probe is attached to a tuning fork can be used.

That is, the invention also relates to a method for measuring the dielectric properties of a sample with a scanning probe microscope comprising an oscillating tuning fork probe, a sample and a source of electromagnetic radiation, which method comprises the steps of a) inducing oscillations of the tuning fork at at least two frequencies $f_1$ and $f_2$, wherein $f_1$ is within the full width of the mechanical oscillation resonance frequency $f_{C1}$ of the tuning fork and $f_2$ is within the full width of the mechanical oscillation resonance frequency $f_{C2}$ of the tuning fork; b) interacting the probe with the sample; c) illuminating the probe or a region of the sample including the area of contact with the probe with the electromagnetic radiation at a modulation frequency $f_m$; and d) measuring a change in the mechanical oscillation resonance frequencies of the tuning fork $f_{C1}$ or $f_{C2}$, due to the modulated radiation at the modulation frequency $f_m$, in order to determine dielectric properties of the sample.

Further, the invention also relates to a method for measuring the dielectric properties of a sample with a scanning probe microscope comprising an oscillating tuning fork probe, a sample and a source of electromagnetic radiation, which method comprises the steps of a) inducing oscillations of the tuning fork at at least one frequency $f_1$ that is within the full width of the mechanical oscillation resonance frequency $f_{C1}$ of the tuning fork; b) interacting the probe with the sample; c) illuminating the probe or a region of the sample including the area of contact with the probe with the electromagnetic radiation at a modulation frequency $f_m$; and d) measuring a change in the mechanical oscillation resonance frequency $f_{C2}$ of the tuning fork, due to the modulated radiation at the modulation frequency $f_m$, in order to determine dielectric properties of the sample, wherein the tuning fork exhibits oscillation resonance frequencies $f_{C1}$ and $f_{C2}$ such that at least for one integer n, the frequency $n*f_{C1}$ falls within the full width of the mechanical oscillation resonance frequency $f_{C2}$.

While the below discussion is based on the use of cantilevered probes, nevertheless, the same methodology can be applied when a probe is attached to a tuning fork and e.g. non-optical detection methods (e.g. pietzoelectric) are used to track the corresponding mechanical response. All preferred embodiments disclosed herein with regard to cantilevered probes are also suitable for and can be applied to tuning forks as probes, and are thus part of the invention.

In step a) of the method of the invention, oscillations of the cantilever are induced at at least two frequencies $f_1$ and $f_2$, wherein $f_1$ is within the full width of the mechanical oscillation resonance frequency $f_{C1}$ of the cantilever and $f_2$ is within the full width of the mechanical oscillation resonance frequency $f_{C2}$ of the cantilever.

That is, as shown in FIG. 1 b), the driving piezo 1 induces oscillations of the cantilever 6 at at least two frequencies. These frequencies $f_1$ and $f_2$ are chosen such that they are within the full widths of a respective mechanical oscillation resonance frequency $f_{C1}$ and $f_{C2}$ of the cantilever, respectively. The term "full width" of a respective (mechanical oscillation) resonance frequency as used herein means the frequency range under the bell-shaped resonance curve (e.g. depicted in FIG. 2), preferably full width at tenth maximum (FWTM) or, even more preferably the full width at half maximum (FWHM) of the resonance curve peak. As used in the art, the maximum of the peak is considered the resonance frequency (of the mechanical oscillation).

The mechanical oscillation resonance frequencies of the cantilever are known for commercial cantilevers, or can be determined as known in the art. $f_{C1}$ and $f_{C2}$ may be flexural, lateral or torsional bending modes of the cantilever. In a preferred embodiment, $f_{C1}$ is the first bending mode of the cantilever and $f_{C2}$ is the second bending mode of the cantilever.

In step b) of the method of the invention, the probe is interacted with the sample. This corresponds to the interaction as it takes place in a scanning probe microscope, in particular an AFM, as known in the art. Preferably, interacting the probe with the sample is by intermittent mode or tapping mode scanning probe microscopy or by using contact mode.

In step c) of the method of the invention, the probe or a region of the sample including the area of contact with the probe is illuminated with the electromagnetic radiation at a modulation frequency $f_m$. The modulation may be by pulsing at a repetition rate $f_m$, or the modulation may be by chopping or sinusoidal modulation of the intensity at a rate including a component at frequency $f_m$. The modulation of the illumination at a frequency $f_m$, wherein preferably $f_m=f_2$ or $f_m=|f_1\pm f_2|$, stimulates the cantilever motion at $f_2$ by the optically induced interaction between the probe and the sample directly or through nonlinear mixing with the $f_1$, respectively. Preferably, the electromagnetic radiation is pulsed or continuous wave (CW) and single line, narrowband or broadband radiation and/or has a wavelength of about 10 nm to about 1000 μm, and is preferably visible radiation having a wavelength of 400 nm to 700 nm or infrared radiation having a wavelength of 0.7 μm to 100 μm.

In step d) of the method of the invention, a change in the mechanical oscillation resonance frequencies of the cantilever $f_{C1}$ or $f_{C2}$, due to the modulated radiation at the modulation frequency $f_m$, is measured in order to determine dielectric properties of the sample. As previously discussed, subjecting the sample to an external illumination by radiation that is modulated at a frequency $f_m$, results in optical interaction between the AFM probe and the sample. This interaction depends on the optical properties of the sample and results in the shift the cantilever resonances. Therefore, the change in the mechanical oscillation resonance frequencies of the cantilever $f_{C1}$ or $f_{C2}$ contains information about the dielectric properties of the sample and can be utilized for IR microscopy and spectroscopy. Differently than known in the art, in the present invention, changes in any one of the mechanical oscillation resonance frequencies of the cantilever $f_{C1}$ or $f_{C2}$ are used to determine said optical probe-sample interaction, and thus the optical properties of the sample of interest.

Preferably, in step d) the change in at least one of the mechanical oscillation resonance frequencies of the cantilever $f_{C1}$ or $f_{C2}$ is determined by measuring the change in phase of the mechanical oscillation of the cantilever relative to the excitation of the oscillation at $f_1$ or $f_2$, respectively. That is, in one preferred embodiment at least one of a mechanical phase $\phi_1$ corresponding to the oscillation at $f_1$ or a mechanical phase $\phi_2$ corresponding to the oscillation at $f_2$ is analyzed to derive the corresponding shift of the cantilever resonance frequency. The mechanical driving of the AFM probe at $f_2$ provides nonvanishing amplitude signal even in the absence of the optical interaction and thus ensures a stable measurement of the mechanical phase of the cantilever oscillation at this frequency. The changes in phase directly relate to the shift of the mechanical resonance of the cantilever $f_{C2}$ due to probe-sample interaction, both mechanical and optical. Thus, the detection of the mechanical phase allows for measuring optical properties of the sample.

In preferred embodiments, the method according to the invention further comprises a step of adjusting at least one of the frequencies $f_1$ or $f_2$ to follow the changes in the cantilever resonance $f_{C1}$ or $f_{C2}$, respectively. Preferably, at least one of the cantilever resonances $f_{C1}$ or $f_{C2}$ is tracked by means of a phase-locked loop (PLL). That is, the method includes locking onto the mechanical phase (e.g. tuning $f_2$ to maintain a fixed value of the mechanical phase). The corresponding changes in $f_2$ are largely a simple sum of the changes due to mechanical and the optical interactions. Therefore, the optically induced contribution can be extracted by taking the difference between readings of $f_2$ with and without the optical illumination. In the most preferred embodiment, the phase could be locked onto the mechanical cantilever resonance $f_{C2}$ for optimal performance. Phase locking onto resonance provides maximum resonant enhancement of the probe-sample interaction (disregarding the cantilever and sample mechanics), benefiting to the signal quality. Phase locking onto resonance also maintains constant resonance enhancement, which reduces various nonlinear effects in the mechanical probe-sample system and allows for obtaining setup-independent measures of the optical properties of the sample material. It thus overcomes the limitations of the prior art and enables quantitative optical studies of samples.

In one embodiment, the cantilever oscillation amplitude at at least one of $f_1$ or $f_2$ is used to derive the dielectric properties of the sample.

In one embodiment, the method according to the invention further comprises an additional step of measuring the shift of at least one of the cantilever resonance frequencies $f_{C1}$ or $f_{C2}$ without illumination by the electromagnetic radiation, in order to obtain the response due to pure mechanical tip-sample interaction (i.e. mechanical reference).

In an alternative embodiment, the method according to the invention further comprises an additional step of calculating the shift of at least one of the cantilever resonance frequencies $f_{C1}$ or $f_{C2}$ without illumination by the electromagnetic radiation by using measurements of the shift of at least one other cantilever resonance frequencies $f_{C1}$ or $f_{C2}$ with illumination by the electromagnetic radiation. This allows obtaining the mechanical reference without a separate measurement.

In one embodiment, the method according to the invention further comprises a normalization step using the change in any one of $f_1$ or $f_2$ between the measurement or calculation of $f_1$ or $f_2$ with the illumination by the electromagnetic radiation and the measurement or calculation of $f_1$ or $f_2$ without illumination by the electromagnetic radiation.

In various embodiments, the method includes using the measurements with and without optical illumination to separate the optical interaction from the mechanical response of the measurement setup. Particularly, it allows for extracting the sign of the optical interaction, thus overcoming the limitations of the prior art.

In certain embodiments the microscope is operated in non-contact or intermittent contact mode. In another embodiment the microscope is operated in contact mode.

In a preferred embodiment the power of the electromagnetic radiation source is harmonically modulated.

In the alternative method of the invention for measuring the dielectric properties of a sample, the method comprises the step a) of inducing oscillations of the cantilever at at least one frequency $f_1$ that is within the full width of the mechanical oscillation resonance frequency $f_{C1}$ of the cantilever; steps b) an c) as in the method as discussed above, and the step d) of measuring a change in the mechanical oscillation resonance frequency $f_{C2}$ of the cantilever, due to the modulated radiation at the modulation frequency $f_m$, in order to determine dielectric properties of the sample. This method can be used with a cantilever which exhibits oscillation resonance frequencies $f_{C1}$ and $f_{C2}$ such that at least for one integer n, the frequency $n*f_{C1}$ falls within the full width, at least FWTM, of the mechanical oscillation resonance frequency $f_{C2}$. In other words, a special cantilever is utilized with resonance frequencies $f_{C1}$ and $f_{C2}$ being such that $f_{C1}/f_{C2}=n$, where n is close to an integer. Such cantilever can mechanically induce oscillations at a frequency $f_2$ near $f_{C2}$ through higher harmonics of the driving frequency near $f_{C1}$ even without optical illumination. This mechanically-induced excitation at $f_2$ acts as a proxy for the second driving in the active bimodal operation described before. It thus provides the same benefits as the active bimodal operation, namely, the stable mechanical phase detection and the ability of measuring pure mechanical response of the system.

Preferably, the measurements of the dielectric properties of the sample with the method of the invention are performed for a plurality of spatial positions on the sample and/or for a plurality of wavelengths of the electromagnetic radiation.

In a further preferred embodiment, the illuminating electromagnetic radiation passes through an interferometer and at least one of the frequency shifts, the amplitude or the phase of at least one of the cantilever resonances $f_{C1}$ or $f_{C2}$ are recorded as a function of the reference arm length. The subsequent transformation to the frequency domain (by e.g. Fourier transformation) allows for obtaining the dielectric properties of the sample at a plurality of wavelengths of the electromagnetic radiation.

As discussed before, PiFM measurements are intrinsically affected by the mechanical properties of the sample and the measurements setup. This dependence appears due to the shift of the cantilever resonance upon mechanical interaction with the sample. To illustrate these effects, PiFM measurements were simulated for two materials A and B with different mechanical properties based on a coupled oscillator model described in the Appendix A. The optical properties of the material A are modeled as those of Au and of the material B as those of SiC (see Appendix B). Their mechanical properties are described by a Lennard-Jones-type force model (Jahng et al., 2014) (see Appendix C).

Figure 2:
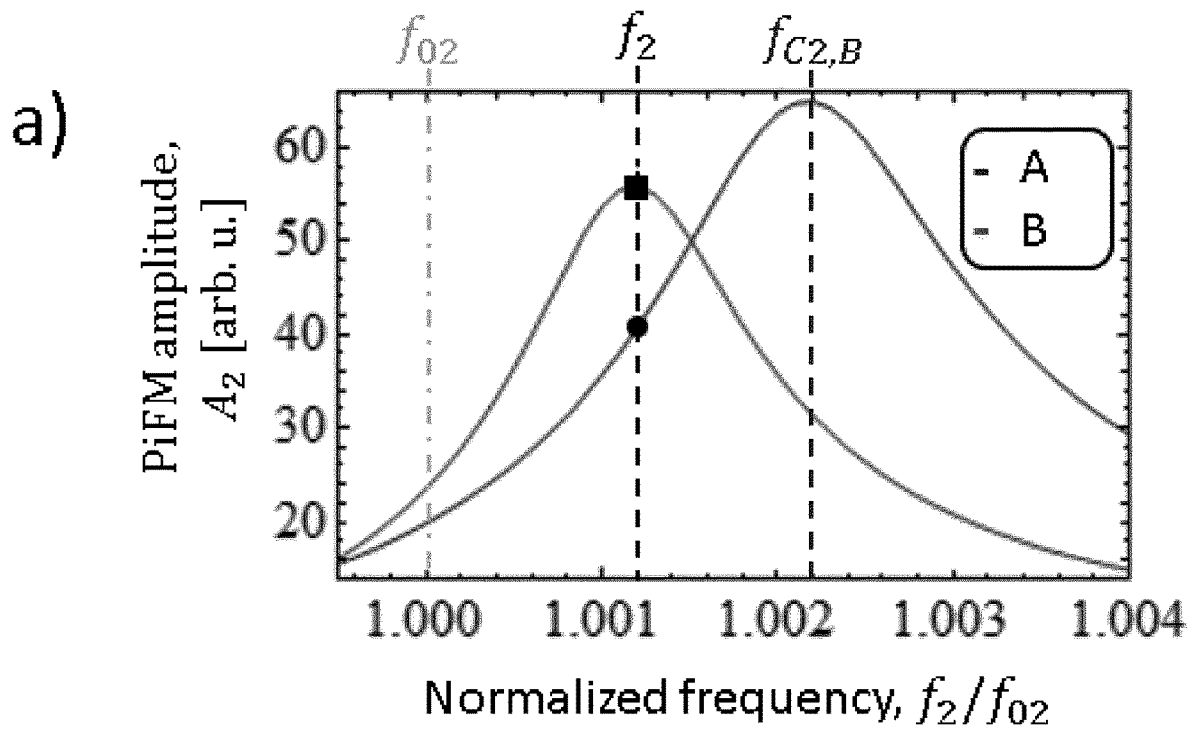
FIG. 2 shows mechanical resonance curves for SiC (material B) sample and Au reference (material A) for 70% (a) and 85% (b) setpoints. A shift of the cantilever resonance is shown which depends on the mechanical properties of the sample/reference and, most importantly, on the setpoint (i.e. experimental parameters). For example, for 70% setpoint at the frequency marked by the black vertical dashed line the PiFM signal on material B (black square in a) is larger than that on material A (black dot in a), while for 85% setpoint the PiFM signal on material B is smaller than on material A (black square and dot in b, respectively).
Figure 2:
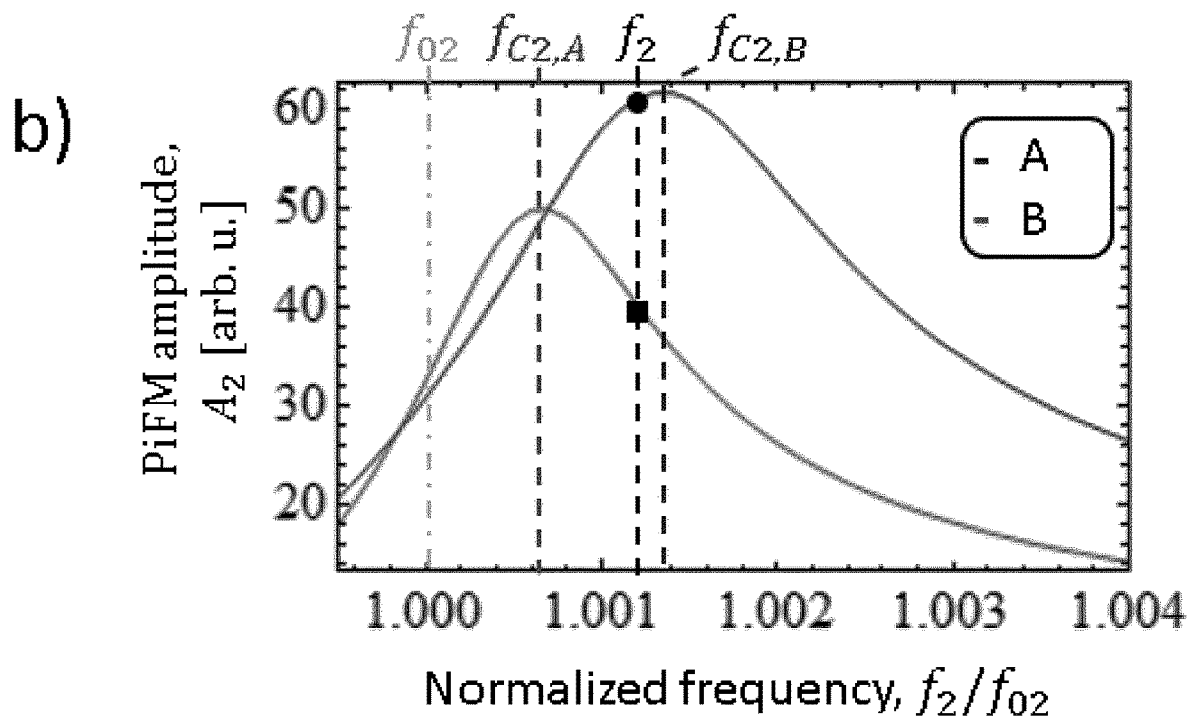

FIG. 2 depicts the PiFM amplitude $A_2$ as a function of normalized frequency, $\tilde{f}_2=f_2/f_{O2}$ for two materials A and B and two different setpoints 70% and 85%. Here 102 is the resonant frequency of a freely oscillating cantilever and $f_2$ is the detection frequency ($f_2=f_1+f_m$). In all cases $A_2$ exhibits a resonant behavior corresponding to the excitation of the second cantilever mode C2. However, it can be seen that the resonance frequency $f_{C2}$ is different from its value for a freely oscillating cantilever $f_{O2}$. This shift depends on the mechanical properties of the sample material: here the material A (darker curve) experiences a larger shift than the material B (lighter). Most importantly, the resonance shift also depends on the setpoint used in the simulation. To demonstrate the drawbacks of such dependence, we fix the mechanical detection frequency $f_2$ to be the cantilever resonance on material B at 70% setpoint (marked by vertical black dashed line in FIG. 2). At this detection frequency PiFM signal on material B (square symbol in FIG. 2a) is larger than on material A (dot symbol in FIG. 2a). Thus, material B would look brighter than material A in a PiFM image at 70% setpoint. That is, the PiFM contrast, defined as a ratio between two PiFM amplitudes:

$$\eta_{PjFM} = \frac{A_{2,B}}{A_{2,A}},$$

is above unity in this case. Upon increasing the setpoint, however, cantilever resonances $f_{C2,A}$ and $f_{C2,B}$ on material A and B, respectively shift to lower frequencies due to weaker mechanical probe-sample interactions. This way, at an 85% setpoint (FIG. 2b) the PiFM amplitude on the material B (square symbol in FIG. 2b) at the detection frequency $f_2$ (vertical black dashed line) is now lower than that on the material A (dot symbol in FIG. 2b). That is, the contrast $\eta_{PiFM}$ has inverted (became below unity), making the material B appear darker than the material A despite no changes in the illumination conditions or optical properties of materials. This shows that measured image contrasts in PiFM do not uniquely relate to the optical properties of materials but depend on the setup mechanics, thus preventing the reproducibility and comparability between different measurements. In principle, the extraction of pure optical contribution could be achieved by measuring the pure mechanical response of a particular PiFM setup. Such characterization would generally require measurements with no optical illumination. However, without illumination no mixing between $f_1$ and $f_m$ would occur, preventing the excitation of the cantilever oscillation at $f_2$ and yielding zero PiFM signal. Thus, the direct measurement of the pure mechanical response is not possible in PiFM.

The dependence on the setup mechanics also adversely affects PiFM spectroscopy. FIG. 3a shows the simulated spectral contrast (the contrast as function of the illumination wavelength $\lambda=1/\omega$ where ω is the IR illumination frequency in wavenumbers), between the aforementioned materials A and B. As it can be seen, PiFM contrast depends heavily on the setpoint and even exhibits the contrast inversion (at the illumination wavelengths between 900 and 920 cm$^{-1}$, $\eta_{piFM}$ is above unity for setpoints <70% and below unity otherwise). Importantly, the spectral shape measured in PiFM does not correspond to the profile of the surface response function, β, which determines the optical interaction between the AFM probe and the sample and directly relates to the dielectric permittivity, ε, of the sample material (see O'Callahan et al. 2018):

$$\beta = \frac{\epsilon - 1}{\epsilon + 1}.$$

As it can be seen in FIG. 3b, β for material B (SiC) becomes negative between ω=945 cm$^{-1}$ and ω=1000 cm$^{-1}$, signifying a repulsive optical interaction with the probe. PiFM being a technique that measures only the amplitude of the cantilever oscillation is insensitive to the sign of the interaction force and essentially returns only the absolute value of β, thus misrepresenting the shape of the material spectrum.

In principle, the sign of optical interaction in PiFM is manifested in the mechanical phase of cantilever oscillation. Repulsive optical interaction increases the mechanical phase (with respect to purely mechanical interaction), while the attractive optical interaction decreases the phase. However, the sign derivation would in general require determination of the reference phase of cantilever oscillation due to pure mechanical interaction, which is again unavailable in PiFM.

The invention presented herein thus solves both problems of the prior art, namely the irreproducibility of PiFM images and the distortion of spectral signature, by enabling measurements of pure, sample-specific mechanical response and by allowing for a reliable detection of the mechanical phase. In order to achieve this, the cantilever is driven at two mechanical frequencies $f_1$ and $f_2$ as depicted in FIG. 1b (i.e. active bimodal operation). The first driving frequency is chosen near one cantilever resonance to provide stable AFM operation and topography feedback. The second driving frequency is chosen near another cantilever resonance (unlike that in MMH). This driving ensures nonvanishing oscillation amplitudes at $f_2$ disregarding the optical interaction, which allows for measuring pure mechanical response of the probe-sample system at each probe position. Particularly, active bimodal operation enables measuring amplitude and, importantly, phase at the detection frequency $f_2$ even without optical illumination, providing pure mechanical references $A_{2,ref}$ and $\phi_{2,ref}$. Having the phase reference allows for the extraction of sign of the optical interaction and thus yields complete information about sample's optical properties.

The optical interaction in active bimodal configuration can be induced by illuminating the probe-sample area with light and modulating this illumination at a frequency $f_m = f_2$ or $f_m = f_2 \pm f_1$ (in general, $f_m$ could be any other linear combination of $f_2$ and $f_1$ with integer coefficients although the optical excitation efficiency would be reduced). In the first case the modulated illumination directly excites cantilever oscillation at frequency $f_2$ by the optical interaction occurring with the same mechanical frequency, while in the second case the cantilever oscillation is excited through a nonlinear mixing of $f_r$ and $f_m$. In the following, the results will be shown for the excitation scheme in which $f_m = f_2 - f_1$ (the direct excitation with $f_m = f_2$ and $f_m = f_2 + f_1$ yield qualitatively similar results).

Figure 3:
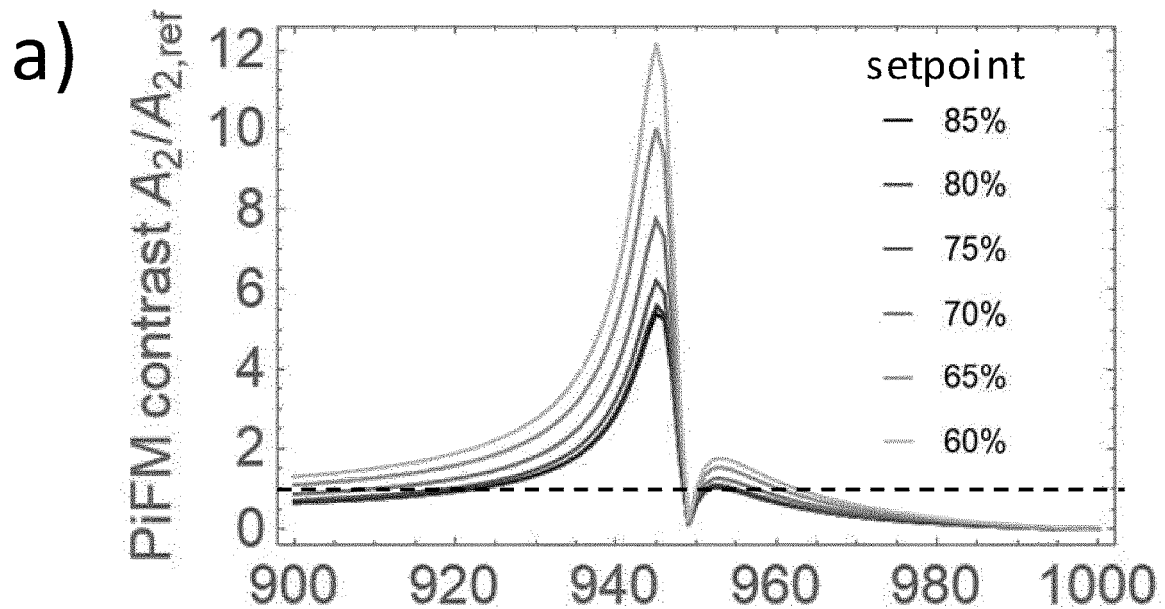
FIG. 3 shows the spectral dependence of PiFM contrast between SiC and Au for different setpoints (a) and the real part of the surface response function $\beta$ that determines the optical interaction (b). Strong dependence of PiFM spectral contrast on the setpoint is evident in panel a (PiFM contrast is defined as the ratio of signals measured on the sample and on the reference, $A_2/A_{2,ref}$). The PiFM contrast for $\omega < 920$ cm$^{-1}$ is below unity (horizontal blue line) for setpoints above 75% and above unity for setpoints below 75%.
Figure 3:
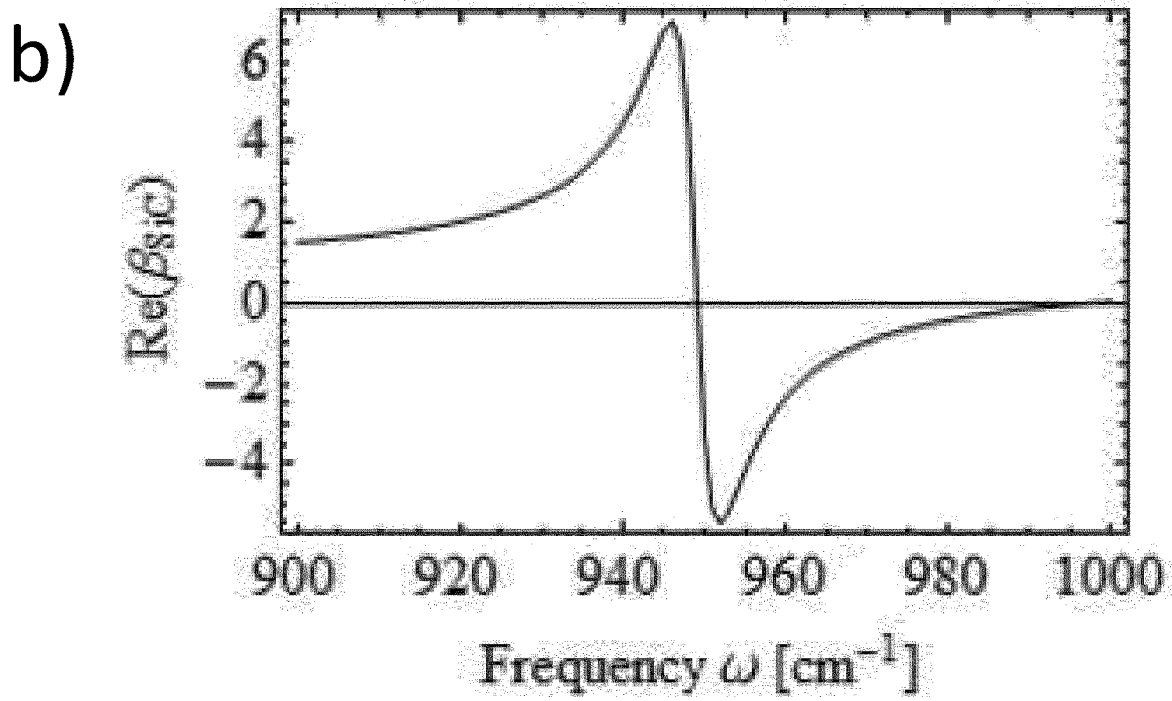
Figure 4:
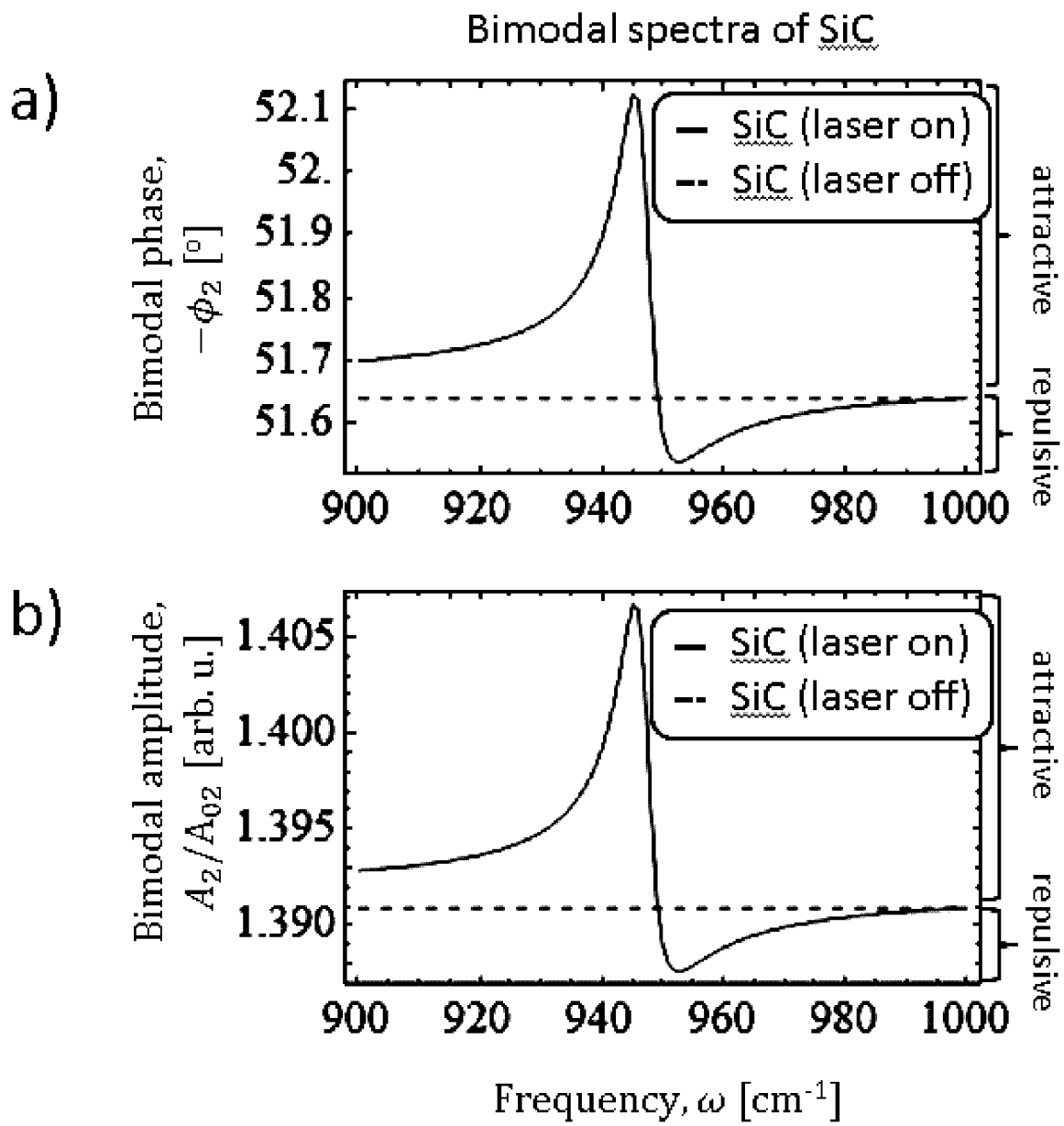
FIG. 4 shows bimodal spectra of SiC. (a) The bimodal phase spectrum of SiC with (solid curve) and without (dashed curve) IR illumination, respectively. (b) The bimodal amplitude spectrum of SiC at 85% setpoint with IR illumination switched on (solid line) and switched off (dashed). The latter records pure mechanical response of the sample and serves as a reliable reference. This reference signal provides a stable phase reference even when the optical interaction vanishes (around $\omega = 1000$ cm$^{-1}$ for example).

To illustrate the benefit of having the mechanical reference a simulated bimodal optical spectrum of the material B (same SiC as in FIG. 3a) is plotted in FIG. 4. It can be seen that the phase spectrum, $\phi_2$ (w) contains the spectral information about the sample's optical properties (solid line in FIG. 4a). Furthermore, the shape of $\phi_2$ resembles well the shape of β(ω) (plotted in FIG. 3b). The mechanical reference (dashed line) obtained without optical excitation serves as a baseline for the optically-induced spectrum and allows for putting the measured phase into prospective. Namely, the values of $\phi_2$ below this baseline signify the attractive optical interaction, while the values above the baseline mean the repulsive one.

Having the mechanical reference also allows for putting the amplitude measurements into perspective. FIG. 4b shows the bimodal amplitude $A_2$ spectrum of the material B (solid curve). It can be seen that $A_2$ can be above or below the mechanical reference (dashed line), i.e. assume positive or negative values with respect to the mechanical reference. In other words, the bimodal amplitude spectrum now captures both the amplitude and the sign of the optical interaction and compares well to β(ω) (FIG. 3b), in sharp contrast to the PiFM spectra (see FIG. 3a).

Phase Locked Loop Operation

In a preferred embodiment, at least one of the cantilever resonances $f_{C1}$ or $f_{C2}$ is tracked by means of a phase-locked loop (PLL). Resonance tracking provides another important benefit by allowing to perform measurements of optical properties of samples that can be compared across different imaging parameters and setups. As discussed before, the changes in the mechanical phase are related to the shift of the cantilever resonance. This shift can be actively tracked by locking onto a phase value and adjusting the detection frequency $f_2$ to keep it constant. In the experiment, this can be achieved by enabling a phase-locked loop (PLL) feedback at $f_2$. The reliability of the PLL functionality relates directly to the phase stability, which in turn requires strong mechanical amplitude. In PiFM, mechanical amplitude directly relates to the mechanical response of the sample that shifts the cantilever resonance away from the detection frequency $f_2$, disabling the resonant enhancement and to the optical tip-sample interaction, which could be weak (for small β for example). Therefore, strong amplitude signal in PiFM cannot always be ensured, preventing the reliable detection of the mechanical phase. In contrast, in active bimodal operation the cantilever is actively driven at the detection frequency $f_2$, ensuring stable amplitude and phase measurements disregarding the strength of optical tip-sample interaction.

Figure 5:
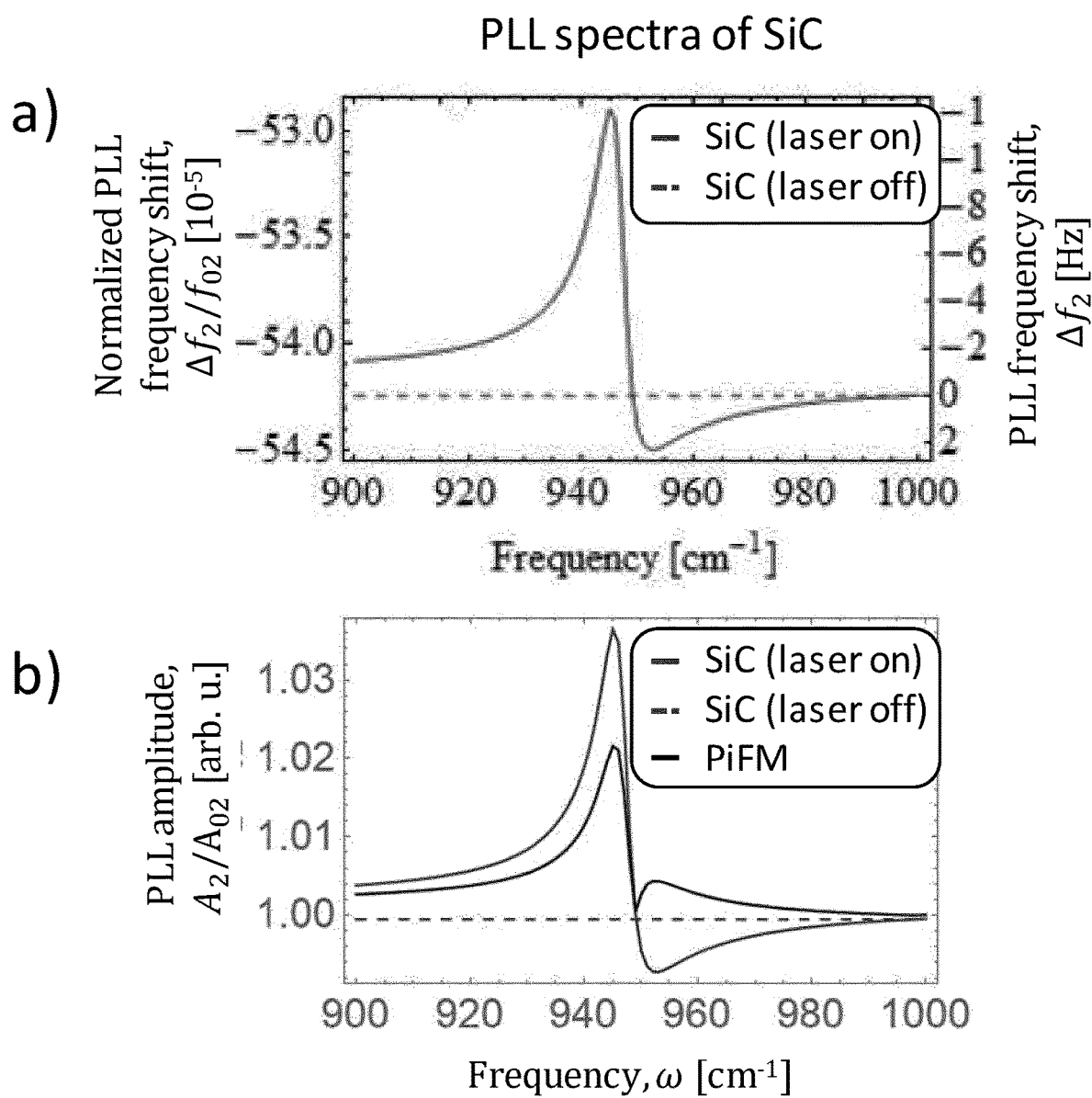
FIG. 5 shows phase locked loop spectra of SiC. (a) Shift of the cantilever resonance $\Delta f_2$ as a function of the illumination wavelength (solid line). Left axis shows $\Delta f_2$ normalized to the resonance of the freely oscillating cantilever $f_{02}$. Right axis shows the same shift with respect to the mechanical reference obtained with the laser switched off (dashed line). This mechanical reference measures the cantilever resonance shift purely due to mechanical tip-sample interaction. (b) The corresponding amplitude spectrum also reflects onto optical properties of the sample and can be also utilized for suppressing mechanical artefacts caused by shifts of the cantilever resonance due to differences in sample mechanical properties.

PLL enables measuring the frequency shift of the cantilever resonance, which can be related to the sample properties. To demonstrate the benefit of such measurements we simulate the PLL frequency spectra $f_2(\omega)$ for the material B (solid red curve) upon locking onto the cantilever resonance (i.e. maintaining $\phi_2$=const. with the value chosen to correspond to the cantilever resonance). The result of this simulation is shown in FIG. 5a. It can be seen that the PLL frequency spectra resemble the shape of the material spectrum β(ω) (FIG. 3b). The mechanical reference, $f_{2,ref}$, simulated in the absence of the optical illumination (i.e. the laser being switched off, dashed line in FIG. 5a), allows for differentiating the sign of the optical interaction in a similar fashion with the bimodal phase and amplitude spectra. The negative relative shift $\Delta f_2 = f_2 - f_{2,ref}$ (plotted on the right axis) signifies the attractive optical interaction, while $\Delta f_2 > 0$ means the repulsive one. It is to be noted that in these calculations the phase was locked to the resonance ($\phi_2$ corresponds to the cantilever resonance). Such locking provides maximum resonant mechanical enhancement of the (weak) optical interaction, which results in larger relative oscillation amplitudes (solid gray curve in FIG. 5b) compared to PiFM (solid black curve) and thus benefits to the sensitivity of our technique.

Figure 6:
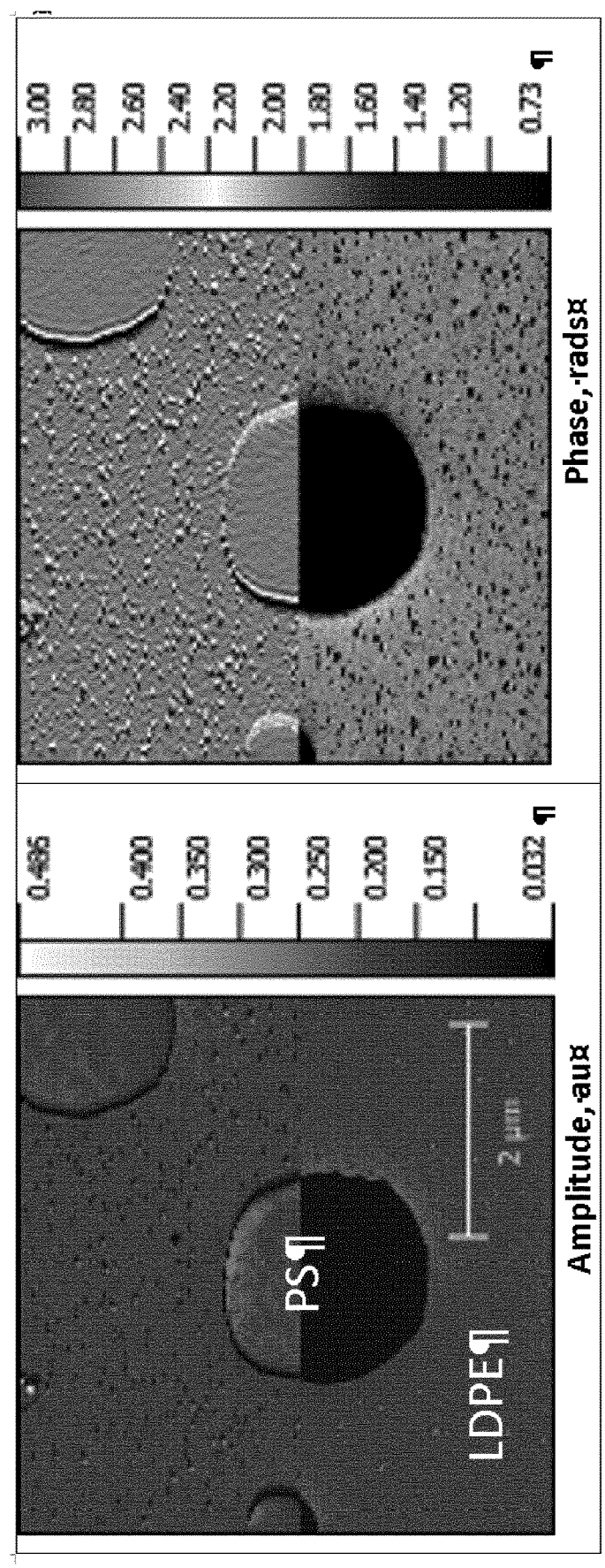
FIG. 6 shows the mechanical amplitude $A_2$ (left) and phase $\phi_2$ (right) measured on PS-LDPE sample using active bimodal operation without laser illumination. The first half of the image was measured with active phase-locked loop (phase is kept constant by phase-locked loop). The amplitude doesn't show pronounced contrast. Second half of the image was done with deactivated phase-locked loop. Now, both amplitude and phase signals exhibit strong contrasts due to shift in the second mechanical resonance frequency.

Importantly, PLL ensures the same resonant mechanical enhancement provided by the cantilever for all materials under the tip. This is illustrated in FIG. 6 that shows mechanical amplitude $A_2$ and phase $\phi_2$ images measured on a polystyrene (PS)-low density polystyrene (LDPE) mixture in the absence of optical illumination. When PLL is turned off, large difference in the elastic moduli of PS and LDPE (about 2 GPa and 0.1 GPa, respectively) results in large shifts of the mechanical resonance C2, yielding strong mechanical contrast in both amplitude and phase (bottom half of FIG. 6). This contrast would strongly obscure PiFM images. PLL on the other hand, actively tracks the shift of the mechanical resonance C2. PLL thus effectively eliminates the mechanical contrast between PS and LDPE (upper half of FIG. 6), that otherwise plaques PiFM.

In one embodiment the driving frequency $f_2$ is locked onto the resonance frequency $f_{C2}$ and the mechanical amplitude $A_2$ of the cantilever oscillation is measured. The changes in $A_2$ in this case are almost purely related to the optical interaction, owing to the same mechanical enhancement provided by the cantilever and thus solving the problems known in the prior art. In a one preferred embodiment, $f_2$ is locked exactly onto $f_{C2}$, thus proving the maximum resonant enhancement to the detected optical signal.

Figure 7:
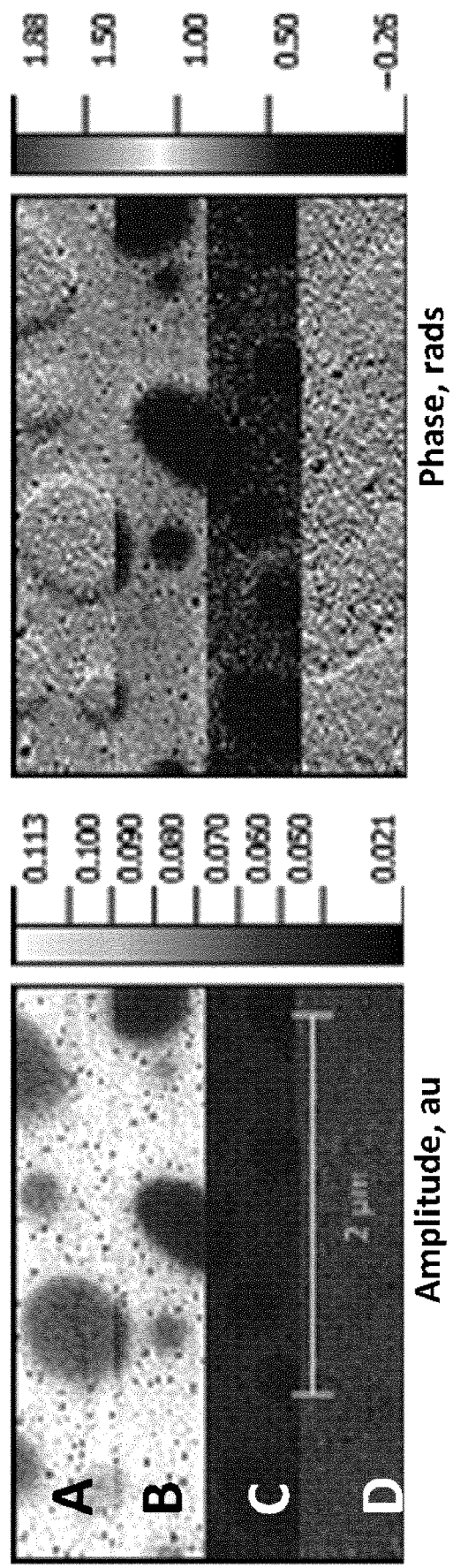
FIG. 7 shows mechanical amplitude $A_2$ (left) and phase $\phi_2$ (right) measured on PS-PMMA sample using active bimodal operation under different conditions A), B), C), and D). A) is measured with laser tuned to absorption line of PMMA-1735 $cm^{-1}$ and PLL turned on. Amplitude signal reflects unimpaired optical contrast. In B) PLL is disabled, laser is on. In C) PLL is disabled, laser is blocked. Both phase and amplitude contrasts reflect mechanical-properties variations. In D) PLL is enabled, laser is blocked. Phase is kept constant by PLL. Amplitude contrast is gone, demonstrating the PLLs capability to remove contributions from varying mechanical properties.

The benefit of PLL for removing mechanical phase artifacts in optical measurements is further demonstrated in FIG. 7 that shows bimodal amplitude $A_2$ and phase $\phi_2$ measured on another polymer mixture of PS and Poly (methyl methacrylate) (PMMA). When PLL is turned off, differences in the mechanical properties of PS and PMMA yield a mechanical contrast both in mechanical amplitude and phase even without laser illumination (region C). When PLL is turned on, the mechanical contrast is eliminated (region D). Thus, with PLL turned on, amplitude image shows pure optical contrast between PMMA and PS (region A). Without PLL the measured contrast would be artificially enhanced due to differences in the mechanical properties of PS and PMMA (see region B). Note that reliable operation of PLL is enabled through active bimodal mode as described in the current invention, which would be troublesome—if not impossible—in PiFM.

Figure 8:
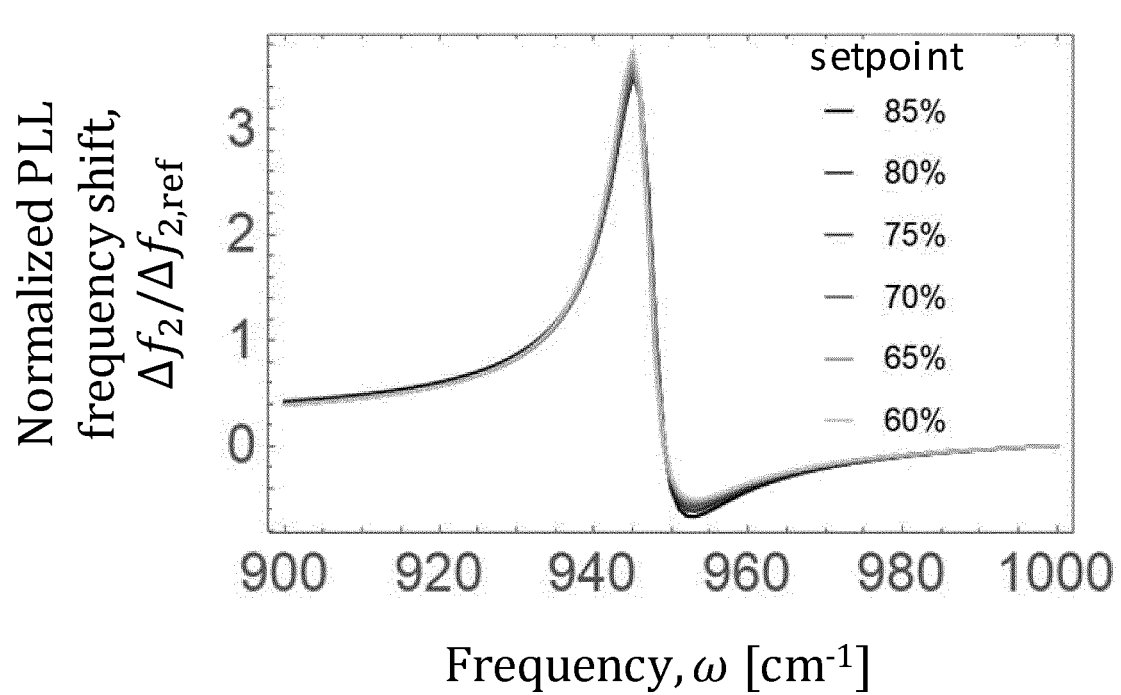
FIG. 8 shows the spectral contrast between SiC and Au in PLL (Phase-locked loop) measurements for different setpoints. In sharp contrast to PiFM spectra (FIG. 2a), the spectral contrast in PLL measurements (defined as the ratio $\Delta f_2/\Delta f_{2,ref}$) is nearly independent of the setpoint. This demonstrates that the bimodal operation and PLL measurements in particular are capable of producing optical contrasts that do not depend on the experimental parameters. Thus bimodal operation enables direct comparison of images and spectroscopic data performed with different experimental parameters.

Most importantly, the PLL could greatly suppress the dependence of measured results on the experimental parameters, such as setpoint. Indeed, the primary effect of changes in the setpoint is the shift of the cantilever resonance. This shift is directly proportional to the gradient of the mechanical interaction force (Jahng et al., 2014) and is tracked by the PLL. This way, PLL always measures the optical interaction with respect to the setpoint-specific mechanical reference. The ability to measure this mechanical reference allows for the extraction of pure (setpoint-independent) optical contribution from the total resonance shift. To demonstrate this point, in FIG. 8 we plot the PLL contrast, $\eta_{PLL}$, between the materials B and A as a function of frequency of the illuminating radiation calculated for different setpoints. This $\eta_{PLL}$ is defined as:

$$\eta_{PLL} = \frac{\Delta f_{2,B}}{\Delta f_{2,A}}.$$

It can be seen that these spectra are nearly identical to each other and show nearly no setpoint dependence for all illumination wavelengths, in sharp contrast to the corresponding PiFM spectra (see FIG. 3a). This demonstrates the ability of the active bimodal system to perform measurements of the optical contrast independent from the setup and sample mechanics. Thus, active bimodal measurements for different experimental parameters can be directly compared to each other, demonstrating the main benefit of the present invention. Furthermore, the mechanics-independent optical contrasts such as $\eta_{PLL}$ can be related directly to the optical properties of measured samples, opening a door to quantitative analytical studies without the necessity to simulate the complicated sample mechanics and cantilever motion dynamics.

Derivation of Mechanical Reference from the Shift of the Fundamental Resonance

In one embodiment, the method according to the invention further comprises an additional step of measuring the shift of at least one of the cantilever resonance frequencies $f_{C1}$ or $f_{C2}$ without illumination by the electromagnetic radiation.

In an alternative embodiment, the method according to the invention further comprises an additional step of calculating the shift of at least one cantilever resonance frequency $f_{C2}$ without illumination by the electromagnetic radiation by using measurements of the shift of another cantilever resonance frequency $f_{C1}$.

As discussed before, the derivation of purely optical contribution to the shift of the cantilever resonance, as well as evaluation of PLL contrast, requires knowing the cantilever response due to pure mechanical interaction. The mechanical response can be obtained through a separate measurement without optical illumination (i.e. the laser being switched off). This means that, at every spatial location on the sample two measurements should be performed with and without optical illumination (see FIG. 9, left).

Figure 9:
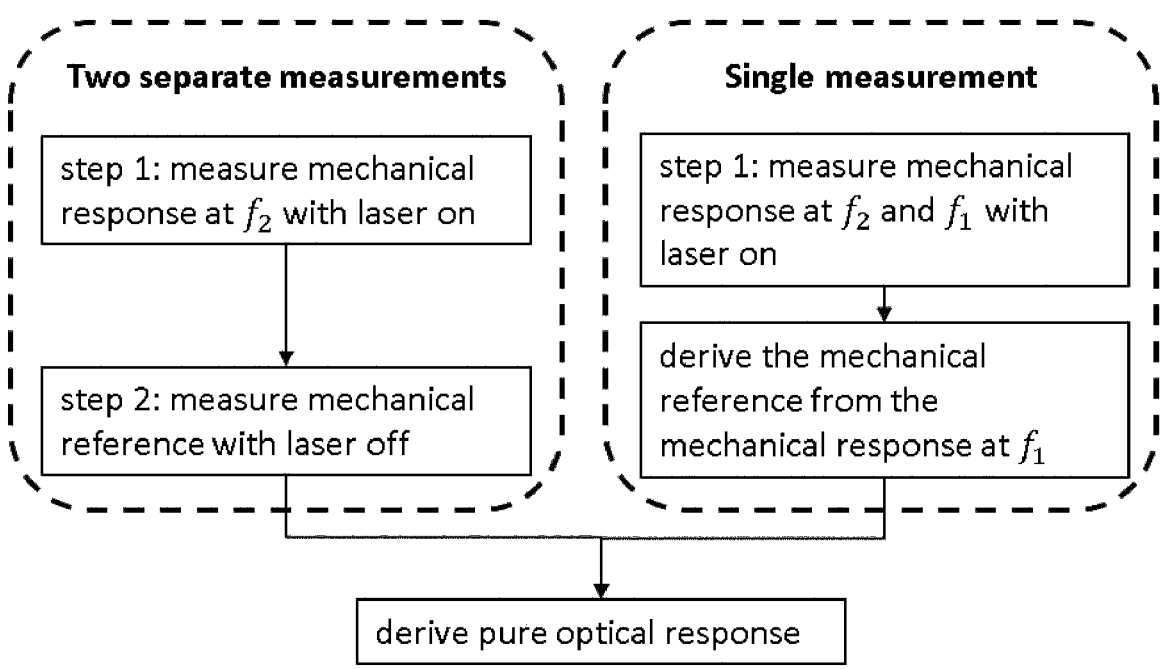
FIG. 9 shows a comparison scheme of two-step vs. single-step procedure for determining mechanical reference.

A drawback of such a two-step procedure, i.e. measuring the mechanical response through a separate measurement without optical illumination, is the increased image acquisition time. This drawback can be eliminated as described below. The shifts of all the cantilever resonances $f_{C1}$, $f_{C2}$, etc. with respect to the resonances of freely oscillating cantilever $f_{01}$, $f_{02}$, etc. have predominantly mechanical nature and are related to the same mechanical force. Therefore, it is possible to relate the shifts induced by purely mechanical response in one cantilever resonance to the others. In particular, if $f_{C1}$ is known, one can at least in principle derive $f_{C2}$ through a mathematical procedure M:

$$f_{C2} = M_p(f_{C1})$$

Wherein the index p stands for some known constants, such as quality factor of mechanical resonances, stiffness constants, etc. The values for these constants are either specified on commercially available cantilevers or could be obtained by known calibration procedures (Lozano, Kiracofe, Melcher, Garcia, & Raman, 2010). Assuming that the effect of optical excitation on the fundamental tapping mode is negligible, i.e. $f_{C1}$ is unaffected by the optical interaction, the result of applying the mathematical procedure M would yield the resonance frequency $f_{2,ref}$ due to pure mechanical interaction. That is, one could obtain the mechanical reference in a single measurement step with optical illumination turned on (FIG. 9, right). This way, one can significantly reduce the measurement time, while keeping all the benefits described in this invention.

To illustrate the concept of using a mathematical procedure to extract the mechanical reference, we adopt a coupled oscillator model (same as employed here for other simulations). It can be shown that for relatively small tapping amplitudes the mechanical contribution to the shift of the second mechanical resonance is (see Appendix D):

$$\Delta f_{2,ref} \simeq \frac{f_{02}}{f_{01}} \frac{k_1}{k_2} \Delta f_1$$

Here we assumed for simplicity that both the fundamental tapping frequency $f_1$ and the detection frequency $f_2$ are locked to the corresponding resonance frequencies $f_{C1}$ and $f_{C2}$, respectively, using PLL. Such derivation only requires knowing the resonance frequencies of a free cantilever and the stiffness constants for the two resonances. Of course, more sophisticated models can be utilized depending on the desired accuracy.

Instead of utilizing frequency shifts of the first resonance, it is also possible to obtain the mechanical reference from the measurements of mechanical phase at the fundamental tapping frequency (due to a direct relationship between the mechanical phase and the shift of mechanical resonance). That is, to construct another mathematical procedure, $M'_p$, that would yield the second resonance frequency as a function of mechanical phase $\phi_1$ at the tapping frequency: $f_{C2}=M'_p,(\phi_1)$. In general, any other measurable quantity (or a set of measurable quantities) related to the fundamental tapping could be used, with an appropriate mathematical procedure, to derive $f_{C2}$.

Figure 10:
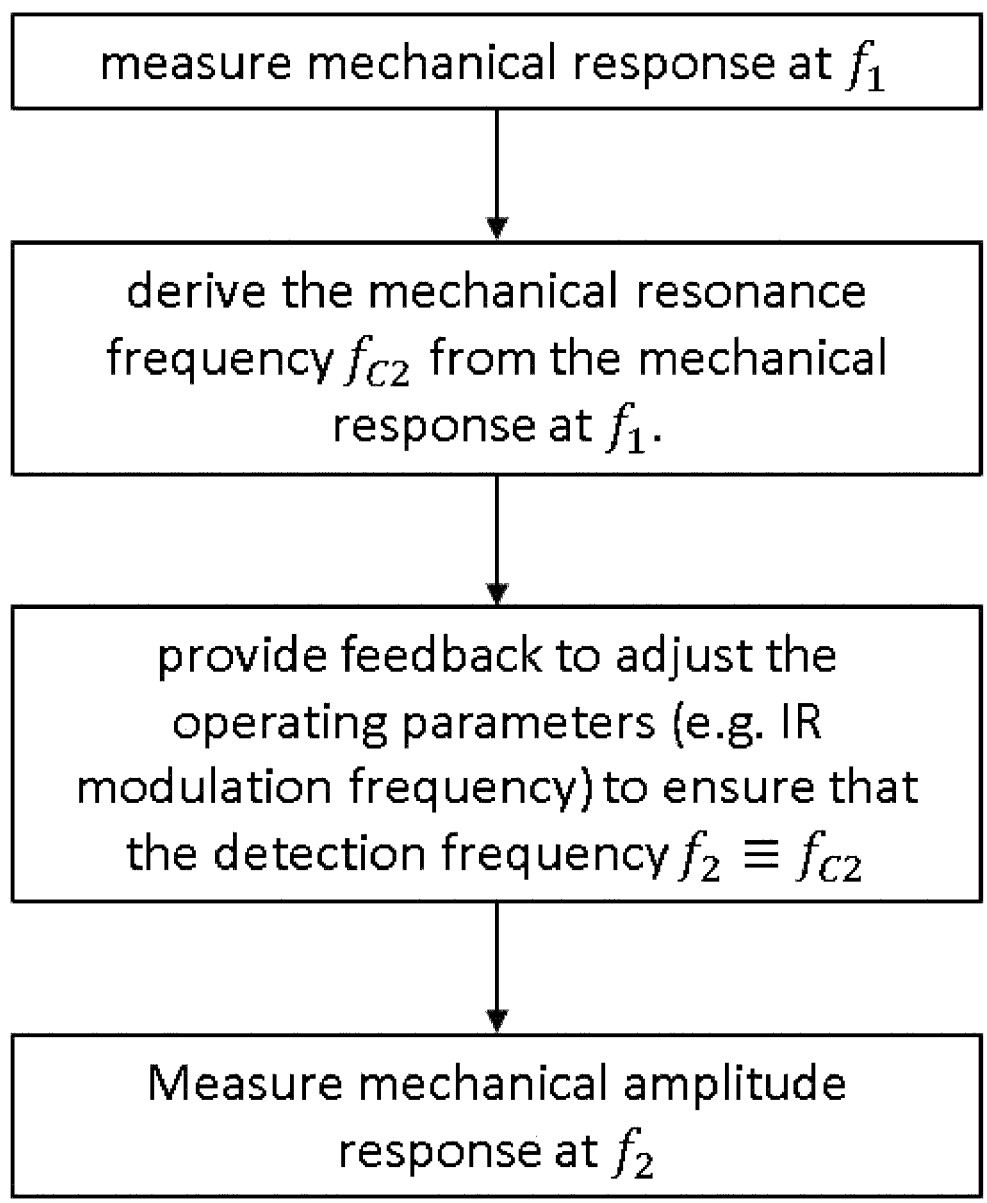
FIG. 10 shows a scheme for improving the sensitivity of existing AFM-based techniques for nanoscale optical microscopy and spectroscopy.

Maximizing Resonant Mechanical Enhancement in PiFM by Predicting the Shift of the Second Cantilever Resonance Deriving the shift in the second cantilever resonance due to mechanical interaction with the sample from the measurements on the first resonance could be utilized to improve the sensitivity of PiFM. As illustrated in FIG. 10, this can be achieved by adjusting the modulation frequency of the illuminating light $f_m$ to ensure that the combined effect of tapping and modulation always yield the detection frequency $f_2$ matching the second cantilever resonance, i.e. $f_2 \equiv f_{C2}$. The corresponding $f_{C2}$ is again found through some mathematical procedure $M_p$ (yielding $f_2=f_{C2}$). This way, the second cantilever resonance always provides maximum mechanical enhancement to the (weak) optical signal, potentially achieving stronger mechanical amplitudes similar to PLL amplitude shown in FIG. 5b (gray curve). Note, that although providing higher sensitivity, this method is still unable to differentiate the sign of the optical interaction—thus still being problematic for the interpretation of spectral signatures as in regular PiFM (see FIG. 3 and the corresponding discussion).

While discussed in the context of PiFM, deriving $f_{C2}$ from the fundamental tapping and adjusting the modulation frequency $f_m$ (or detection frequency $f_2$ in general) to track the resonance could benefit the sensitivity of other AFM-based techniques for nanoscale resolved optical (IR) microscopy and spectroscopy, such as photothermal expansion microscopy and spectroscopy (generally known as PTIR or AFM-IR) and especially tapping PTIR (Tuteja, Kang, Leal, & Centrone, 2018).

In one embodiment the frequency $f_2$ is adjusted to follow the measured change in the resonance frequency $f_{C2}$ and the mechanical amplitude of the cantilever oscillation at the frequency $f_2$ is measured to analyze the optical response of the sample. Preferably, the tracking is done via PLL.

In an alternative embodiment the frequency $f_2$ is adjusted using the shift of the cantilever resonance frequency $f_{C2}$ calculated from the shift of the shift of cantilever resonance $f_{C1}$ and the amplitude of the cantilever oscillation at the frequency $f_2$ is used to analyze the optical response of the sample.

Using Special Tips as a Proxy for Active Bimodal Driving

In an alternative embodiment, the present invention relates to a method for measuring the dielectric properties of a sample with a scanning probe microscope comprising an oscillating cantilever probe, a sample and a source of electromagnetic radiation, which method comprises the steps of
  a) inducing oscillations of the cantilever at at least one frequency $f_1$ that is within the full width of the mechanical oscillation resonance frequency $f_{C1}$ of the cantilever;
  b) interacting the probe with the sample;
  c) illuminating the probe or a region of the sample including the area of contact with the probe with the electromagnetic radiation at a modulation frequency $f_m$; and
  d) measuring a change in the mechanical oscillation resonance frequency $f_{C2}$ of the cantilever, due to the modulated radiation at the modulation frequency $f_m$, in order to determine dielectric properties of the sample, wherein the cantilever exhibits oscillation resonance frequencies $f_{C1}$ and $f_{C2}$ such that at least for one integer n, the frequency $n*f_{C1}$ falls within the full width of the mechanical oscillation resonance frequency $f_{C2}$.

The preferred embodiments of steps a) to d) correspond accordingly to those of steps a) to d) as described above. The cantilever used in this method exhibits oscillation resonance frequencies $f_{C1}$ and $f_{C2}$ such that at least for one integer n, the frequency $n*f_{C1}$ falls within the full width, preferably within the FWTM, more preferably within the FWHM of the mechanical oscillation resonance frequency $f_{C2}$.

Figure 11:
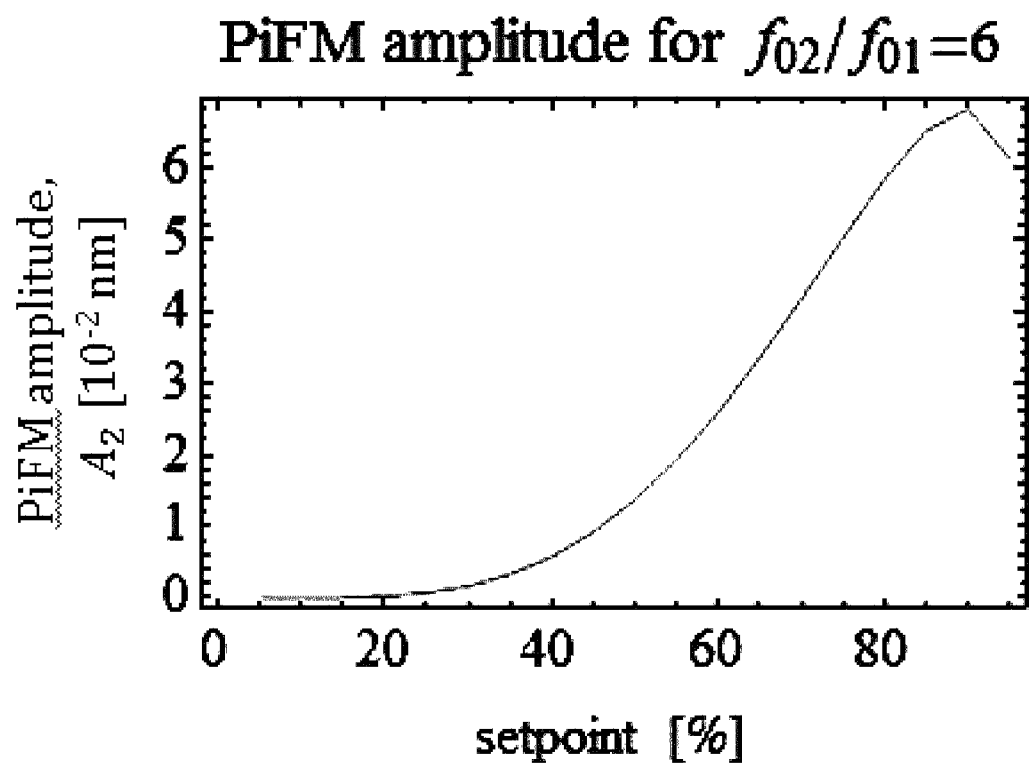
FIG. 11 shows the PiFM amplitude, $A_2$, as a function of setpoint for a special tip for which $f_{02}/f_{01}=n$ without modulated illumination by electromagnetic radiation (here n=6, $A_{01}=10$ nm).

While the operability of the technique described above is achieved by active bimodal operation, i.e. driving the tip oscillation at two mechanical frequencies, a similar result can be achieved in a single mode driven AFM system by employing specially designed cantilevers for which the ratio of any two resonance frequencies is approximately an integer. In such case, driving the cantilever at a single (lower) resonance frequency will excite the other (upper) resonance through higher harmonics of the driving frequency facilitated solely by the mechanical interaction with the sample. This excitation acts as a proxy for direct mechanical driving of the second resonance and thus yields a nonvanishing mechanical signal even in the absence of the modulated optical illumination. FIG. 11 demonstrates this concept by showing the simulated amplitude, $A_2$, of the second cantilever resonance as a function of setpoint without the illumination by electromagnetic radiation. A special tip with a ratio of the second resonance frequency to the first resonance frequency $f_{02}/f_{01}=6$ is assumed with $A_{01}=10$ nm. One can see that for setpoints >40% the oscillation amplitude $A_2$ is nonzero. This nonvanishing signal can serve as a mechanical reference, enabling a reliable PLL functionality similar to what is achieved by active bimodal operation that is the main point of this invention.

To conclude, the present invention introduces a technique for highly-localized AFM-based measurements of optical (preferably IR) properties of materials based on the detection of frequency shifts of the cantilever resonance(s) induced by the optical interactions. This invention allows for measurement of pure optical contrast that does not depend on the setup mechanics, thus overcoming the limitations of the prior art technique that suffer from irreproducibility and cross-system incomparability of measurements.

APPENDICES

Appendix A: Model for Describing Cantilever Dynamics

The cantilever motion is modeled as a collection of independent harmonic oscillator modes, with motion confined in one dimension along the vertical z-axis. The equations of motion for each mode can be written as (Jahng et al., 2014):

$$m\ddot{z}_n + b_n \dot{z}_n + k_n z_n = F_{d,n} \cos(2\pi f_n t) + F_{int}(z(t)), \quad (1)$$

where m is the effective mass of the cantilever, $k_n$, $b_n$, and $z_n$ are the force constant, the damping constant and the coordinate associated with the n-th mode, respectively. Each mode can be excited by an external driving force $F_{d,n}$ with frequency $f_n$. $F_{int}$ is the interaction force that accounts for the tip-sample interaction and couples the oscillator modes, $F_{int}$ includes both relevant forces—the mechanical and the optical one—and depends on the instantaneous distance between the tip and the sample, z(t):

$$z(t) = z_c + \sum_n z_{n'}$$

where $z_c$ is the equilibrium position of the cantilever and the sum is taken over all oscillators. Here, we limit ourselves to considering two oscillators for the description of the cantilever motion. Therefore, in the stationary state $$z(t) = z_c + A_1 \sin(2\pi f_1 t + \phi_1) + A_2 \sin(2\pi f_2 t + \phi_2), \quad (2)$$

where $A_{1,2}$ and $\phi_{1,2}$ are the amplitude and phase of each oscillator, respectively.

Plugging Eq. (2) into Eq. (1) and multiplying equation for each mode by $\exp(2\pi i f_n t + \phi_n)$, followed by integration over the (common) oscillation period T, we obtains two complex-valued equations (one for each mode):

$$A_n e^{-i\phi_n} \left[ i(k_n - m\omega_n^2) + b_n \omega_n \right] = F_n + 2 f_n \int_0^T F_{int}(z(t)) e^{2\pi i f_n t} dt. \quad (3)$$

For convenience, Eq. (3) can be further rewritten using resonant frequencies of freely oscillating cantilever $f_{0n}$ and resonance quality factors $Q_n = 2\pi f_n m / b_n$:

$$A_n k_n e^{-i\phi_n} \left[ i \left( 1 - \frac{f_n^2}{f_{0n}^2} \right) + \frac{1}{Q_n} \frac{f_n}{f_{0n}} \right] = F_n + 2 f_n \int_0^T F_{int}(z(t)) e^{2\pi i f_n t} dt \quad (4)$$

Without the loss of generality, we can assume that mode 1 is used for providing topography feedback and mode 2 is used for the detecting the optical interaction and solve this set of two equations numerically. To simulate PiFM we set $F_2 = 0$ and fix the driving force $F_1$ at:

$$F_1 = A_{01} k_1 \sqrt{\left( 1 - \left( \frac{f_1}{f_{01}} \right)^2 \right)^2 + \frac{1}{Q_1^2} \frac{f_1^2}{f_{01}^2}},$$

where $A_{01}$ is the free tapping amplitude. We further write $F_{int}$ as a sum of mechanical and optical forces:

$$F_{int}(z) = F_{mech}(z) + F_{opt}(z) \cos(2\pi f_m t) \quad (5)$$

with the optical force being modulated with frequency $f_m$. The exact models used here are discussed in the following appendices. Assuming all the constants $k_n$, $Q_n$ and $f_{0n}$ are known, the solution of Eq. (4) with fixed frequencies of tapping and detection $f_1$ and $f_2$, respectively, yields the mechanical amplitude $A_2$, which represents the signal with PiFM experiments.

To simulate a bimodal experiment, we set $$F_2 = A_{02} k_2 \sqrt{\left( 1 - \left( \frac{f_2}{f_{02}} \right)^2 \right)^2 + \frac{1}{Q_2^2} \frac{f_2^2}{f_{02}^2}}$$

with the second free tapping amplitude $A_{02} \neq 0$ and solve for $A_2$ and the mechanical phase $\phi_2$ using the same interaction force (5). FIGS. 3 and 4 simulated the response at the detection frequency $f_2/f_{02}$: =1.0008, and FIG. 11 the detection frequency was assumed $f_2/f_{02}=1$.

Finally, to simulate PLL we fix the mechanical phase of the second cantilever mode at $\phi_2$=Const (the constant here is chosen depending on the desired detuning from the cantilever resonance) and solve for $A_2$ and the frequency $f_2$. It is further convenient to use a dimensionless normalized frequency $\tilde{f}_2 = f_2/f_{02}$ and the frequency shift from the resonance of a freely-oscillating cantilever $\Delta f_2 = f_2 - f_{02}$. For all PLL simulations we have used $\phi_2 = 0$, which corresponds to locking onto resonance.

The cantilever constants were taken as $Q_1 = 200$, $k_1 = 1.6 \times 10^3$ pN/m, $Q_2 = 1254$, $k_2 = 62.9 \times 10^3$ pN/m, $f_{02}/f_{01} = 6.2$ (except than $f_{02}/f_{01} = 6$ in FIG. 11) (Jahng et al., 2014). Also, the tapping frequency was taken as $f_1/f_{01} = 1$ for all simulations.

Appendix B: Model for Optical Interaction

According to the point dipole model, the (vertical) force due to optical tip-sample interaction can be calculated as (O'Callahan et al., 2018):

$$F^{(dip)} = -\frac{3\beta'}{16\pi\epsilon_0 (z + r_t)^4} |\alpha_{eff}|^2 |E_i|^2, \quad (6)$$

where z is the tip height above the sample surface, $r_t$ is the tip radius, $E_i$ is the illuminating field, $\epsilon_0$ is the vacuum permittivity, $\beta'$ is the real part of the surface response function $\beta = (\epsilon - 1)/(\epsilon + 1)$ and $\alpha_{eff}$ is the effective polarizability of the tip, which can be written as (Cvitkovic, Ocelic, & Hillenbrand, 2007):

$$\alpha^{eff} = \alpha_0 \left[ 1 - \frac{\overline{\alpha}_0 \beta}{16\pi\epsilon_0 (z + r_t)^2} \right]^{-1}, \quad (7)$$

with $\alpha_0$ being the (bare) polarizability of the particle in free space (no sample):

$$\alpha_0 = 4\pi\epsilon_0 r_t^3 \frac{\epsilon_t - 1}{\epsilon_t + 2} \quad (8)$$

Here $\epsilon_r$ is the permittivity of the tip material.

The point dipole model used for deriving equation (6) assumes that the tip is a small particle much smaller than the illumination wavelength. In order to account for the realistic field enhancement produced by a realistic AFM tip (that is a long, often metallized structure), we add an empirical enhancement factor $f_{enh}$ to the effective polarizability. This way, the optical force reads as:

$$F^{(dip)} = -\frac{3\beta'}{16\pi\epsilon_0(z+r_t)^4}|\alpha_{eff}|^2 f_{enh}^2 |E_t|^2 \quad (9)$$

In our simulations we assumed a typical illumination of $|E_i|=10^6$ V/m used in PiFM experiments (Yang & Raschke, 2015) and realistic $f_{enh}=10$ (Huber, Keilmann, Wittborn, Aizpurua, & Hillenbrand, 2008). The tip permittivity was taken as $\epsilon_t=-5000+1000i$ and the tip radius as a typical $r_t=20$ nm.

The optical properties of materials A was modeled after Au with permittivity taken from (Ordal, Bell, Alexander, Long, & Querry, 1985).

The permittivity of material B was modelled according to $$\epsilon_{SiC} = \epsilon_\infty \left(1 + \frac{\omega_{LO}^2 - \omega_{TO}^2}{\omega_{TO}^2 - \omega^2 - i\omega\gamma}\right) \quad (10)$$

with $\epsilon_\infty=6.56$, $\omega_{TO}=797$ cm$^{-1}$, $\omega_{LO}=970$ cm$^{-1}$ and $\gamma=5.9$ cm$^{-1}$, which describe the permittivity of SiC relevant for near-field interaction with the tip (Cvitkovic et al., 2007). The frequency of the illuminating light, $\omega$, was taken as 900 cm$^{-1}$ in the simulations depicted in FIG. 2.

Appendix C: Model for Mechanical Interaction

The mechanical interaction was modeled as a Lennard-Jones-type force model (Jahng et al., 2014):

$$F_{mech} = f_0\left(\frac{L^4}{3z^6} - \frac{1}{z^2}\right) \quad (11)$$

with $f_0=13\times10^3$ pN/nm$^2$. The force range constant, L, was taken 17 nm and 28 nm for materials A and B, respectively.

Appendix D: Shifts of the Mechanical Resonances Due Mechanical Tip-Sample Interaction The frequency shifts of cantilever resonances due to mechanical interaction with the sample can be estimated analytically under an assumption that within the tip oscillation range the interaction force can be approximated using the first two terms in its Taylor expansion around the equilibrium position z (Jahng et al., 2014). Thus $$F_{int}(z(t)) \approx F_c(z_c) + \partial F_c(z)/\partial z|_{z_c}(z-z_c) - \Gamma(z_c)\dot{z}, \quad (12)$$

where $F_0(z)$ is the conservative and $-\Gamma(z_c)\dot{z}$ is the nonconservative contributions to the interaction force. Using eq. (12) and the explicit expression (2) for $z(t)$, one can analytically evaluate the integral in the right hand side of eq. (4). Assuming $\phi_n=0$ (locking to resonance) for simplicity, the only contribution relevant for the frequency shift arises from $$\int \frac{\partial F_c}{\partial z}(z_c)(z-z_0)e^{2\pi i f_n t}dt = A_n\frac{\partial F_c}{\partial z}(z_c)\frac{i}{2f_n} \quad (13)$$

By equaling the imaginary parts in the right-hand side and the left-hand side of eq. (4), one immediately obtains $$1 - \left(\frac{f_n}{f_{on}}\right)^2 = \frac{1}{k_n}\frac{\partial F_c}{\partial z}(Z_c) \quad (14)$$

Using the fact that the resonance shift is small compared to the frequency of free cantilever oscillations $f_{02}$ we further simplify $$\frac{f_n}{f_{on}} - 1 \approx \frac{-1}{2k_n}\frac{\partial F_c}{\partial z}(Z_c) \quad (15)$$

This equation shows that the shifts in resonances of all modes are related to the gradient of the same interaction force, directly yielding the equation:

$$\Delta f_{2,ref} \approx \frac{f_{02}}{f_{01}}\frac{k_1}{k_2}\Delta f_1 \quad (16)$$

REFERENCES

Ambrosio, A., Devlin, R. C., Capasso, F., & Wilson, W. L. (2017). Observation of Nanoscale Refractive Index Contrast via Photoinduced Force Microscopy. *ACS Photonics*, 4(4), 846-851. https://doi.org/10.1021/acsphotonics.6b00911

Cvitkovic, A., Ocelic, N., & Hillenbrand, R. (2007). Analytical model for quantitative prediction of material contrasts in scattering-type near-field optical microscopy. *Optics Express*, 15(14), 8550-8565. https://doi.org/10.136410E.15.008550

Dazzi, A., Prazeres, R., Glotin, F., & Ortega, J. M. (2005). Local infrared microspectroscopy with subwavelength spatial resolution with an atomic force microscope tip used as a photothermal sensor. *Optics Letters*, 30(18), 2388. https://doi.org/10.1364/OL.30.002388

Huber, A. J., Keilmann, F., Wittborn, J., Aizpurua, J., & Hillenbrand, R. (2008). Terahertz near-field nanoscopy of mobile carriers in single semiconductor nanodevices. *Nano Letters*, 8(11), 3766-3770. https://doi.org/10.1021/n1802086x Jahng, J., Brocious, J., Fishman, D. A., Huang, F., Li, X., Tacoma, V. A., ... Potma, E. O. (2014). Gradient and scattering forces in photoinduced force microscopy. *Physical Review B—Condensed Matter and Materials Physics*, 90(15), 155417. https://doi.org/10.1103/PhysRevB.90.155417

Lozano, J. R., Kiracofe, D., Melcher, J., Garcia, R., & Raman, A. (2010). Calibration of higher eigenmode spring constants of atomic force microscope cantilevers. *Nanotechnology*, 21(46). https://doi.org/10.1088/0957-4484/21/46/465502

O'Callahan, B. T., Yan, J., Menges, F., Muller, E. A., & Raschke, M. B. (2018). Photoinduced TipSample Forces for Chemical Nanoimaging and Spectroscopy. *Nano Letters*, 18(9), 5499-5505. https://doi.org/10.1021/acs.nanolett.8b01899

Ordal, M. a, Bell, R. J., Alexander, R. W., Long, L. L., & Querry, M. R. (1985). Optical properties of fourteen metals in the infrared and far infrared: Al, Co, Cu, Au, Fe, Pb, Mo, Ni, Pd, Pt, Ag, Ti, V, and W. *Applied Optics*, 24(24), 4493. Retrieved from http://www.ncbi.nlm.nih.gov/pubmed/18224235

Tuteja, M., Kang, M., Leal, C., & Centrone, A. (2018). Nanoscale partitioning of paclitaxel in hybrid lipid-polymer membranes. *Analyst,* 143(16), 3808-3813. https://doi.org/10.1039/c8an00838h Yang, H. U., & Raschke, M. B. (2015). Optical gradient force nano-imaging and -spectroscopy, 1-5. Retrieved from http://arxiv.org/abs/1508.06358

The invention claimed is:

1. Method for measuring dielectric properties of a sample with a scanning probe microscope comprising an oscillating cantilever probe, a sample and a source of electromagnetic radiation, which method comprises the steps of
   a) inducing oscillations of the cantilever at at least two frequencies $f_1$ and $f_2$, wherein $f_1$ is within a full width of a first mechanical oscillation resonance frequency $f_{C1}$ of the cantilever and $f_2$ is within a full width of a second mechanical oscillation resonance frequency $f_{C2}$ of the cantilever;
   b) interacting the probe with the sample;
   c) illuminating the probe or a region of the sample, including an area of contact with the probe, with the electromagnetic radiation at a modulation frequency $f_m$; and
   d) measuring a change in the mechanical oscillation resonance frequencies of the cantilever $f_{C1}$ or $f_{C2}$, due to the modulated radiation at the modulation frequency $f_m$, in order to determine dielectric properties of the sample.

2. Method for measuring dielectric properties of a sample with a scanning probe microscope comprising an oscillating cantilever probe, a sample and a source of electromagnetic radiation, which method comprises the steps of
   a) inducing oscillations of the cantilever at at least one frequency $f_1$ that is within a full width of a first mechanical oscillation resonance frequency $f_{C1}$ of the cantilever;
   b) interacting the probe with the sample;
   c) illuminating the probe or a region of the sample, including an area of contact with the probe, with the electromagnetic radiation at a modulation frequency $f_m$; and
   d) measuring a change in a second mechanical oscillation resonance frequency $f_{C2}$ of the cantilever, due to the modulated radiation at the modulation frequency $f_m$, in order to determine the dielectric properties of the sample,
wherein the cantilever exhibits oscillation resonance frequencies $f_{C1}$ and $f_{C2}$ such that at least for one integer n, the frequency $n*f_{C1}$ falls within a full width of the second mechanical oscillation resonance frequency $f_{C2}$.

3. Method according to claim 1, wherein in step d) the change in at least one of the mechanical oscillation resonance frequencies of the cantilever $f_{C1}$ or $f_{C2}$ is determined by measuring the change in phase of the mechanical oscillation of the cantilever relative to induction oscillation at $f_1$ or $f_2$, respectively.

4. Method according to claim 1, wherein the electromagnetic radiation is pulsed or continuous wave (CW) single line, narrowband or broadband radiation and/or has a wavelength of 10 nm to 1000 µm, and is preferably visible radiation having a wavelength of 400 nm to 700 nm or infrared radiation having a wavelength of 0.7 µm to 100 µm.

5. Method according to claim 1, wherein in step b) interacting the probe with the sample is by using contact mode, intermittent mode or tapping mode scanning probe microscopy.

6. Method according to claim 1, wherein $f_m=f_2$ or $f_m=f_1$ or $f_m=|f_1 \pm f_2|$.

7. The method according to claim 1, further comprising a step of adjusting at least one of the frequencies $f_1$ or $f_2$ to follow the changes in the cantilever resonance frequencies $f_{C1}$ or $f_{C2}$ respectively.

8. The method of claim 7, wherein at least one of the cantilever resonances $f_{C1}$ or $f_{C2}$ is tracked by means of a phase-locked loop (PLL).

9. The method according to claim 1, wherein the cantilever oscillation amplitude at at least one of $f_1$ or $f_2$, is used to derive the dielectric properties of the sample.

10. The method according to claim 1, further comprising an additional step of measuring a shift in at least one of the cantilever resonance frequencies $f_{C1}$ or $f_{C2}$ without illumination by the electromagnetic radiation.

11. The method according to claim 1, further comprising an additional step of calculating the shift of at least one of the cantilever resonance frequencies $f_{C1}$ or $f_{C2}$ without illumination by the electromagnetic radiation by using measurements of a shift in at least one of the cantilever resonance frequencies $f_{C1}$ or $f_{C2}$ with illumination by the electromagnetic radiation.

12. The method of claim 10, further comprising a normalization step using the change in any one of the cantilever resonance frequencies $f_{C1}$ or $f_{C2}$ with the illumination by the modulated electromagnetic radiation and the corresponding change without illumination by the modulated electromagnetic radiation.

13. Method according to claim 1, wherein power of the electromagnetic radiation source is harmonically modulated.

14. Method according to claim 1, wherein the measurements are performed for a plurality of spatial positions on the sample and/or for a plurality of wavelengths of the electromagnetic radiation.

15. Method according to claim 1, wherein the illuminating electromagnetic radiation passes through an interferometer and at least one of a frequency shift, an amplitude or a phase of at least one of the cantilever resonances $f_{C1}$ or $f_{C2}$ are recorded as a function of interferometer reference arm length with subsequent transformation to a frequency domain to obtain the dielectric properties of the sample at a plurality of wavelengths of the electromagnetic radiation.

16. Method for measuring dielectric properties of a sample with a scanning probe microscope comprising an oscillating tuning fork probe, a sample and a source of electromagnetic radiation, which method comprises the steps of
   e) inducing oscillations of the tuning fork at at least two frequencies $f_1$ and $f_2$, wherein $f_1$ is within a full width of a first mechanical oscillation resonance frequency $f_{C1}$ of the tuning fork and $f_2$ is within a full width of a second mechanical oscillation resonance frequency $f_{C2}$ of the tuning fork;
   f) interacting the probe with the sample;
   g) illuminating the probe or a region of the sample, including an area of contact with the probe, with the electromagnetic radiation at a modulation frequency $f_m$; and
   h) measuring a change in the mechanical oscillation resonance frequencies of the tuning fork $f_{C1}$ or $f_{C2}$, due to the modulated radiation at the modulation frequency $f_m$, in order to determine dielectric properties of the sample.

17. Method for measuring dielectric properties of a sample with a scanning probe microscope comprising an oscillating tuning fork probe, a sample and a source of electromagnetic radiation, which method comprises the steps of a) inducing oscillations of the tuning fork at least one frequency $f_1$ that is within a full width of a first mechanical oscillation resonance frequency $f_{C1}$ of the tuning fork;
b) interacting the probe with the sample;
c) illuminating the probe or a region of the sample, including an area of contact with the probe, with the electromagnetic radiation at a modulation frequency $f_m$; and
d) measuring a change in a second mechanical oscillation resonance frequency $f_{C2}$ of the tuning fork, due to the modulated radiation at the modulation frequency $f_m$, in order to determine dielectric properties of the sample, wherein the tuning fork exhibits oscillation resonance frequencies $f_{C1}$ and $f_{C2}$ such that at least for one integer n, the frequency $n*f_{C1}$ falls within a full width of the second mechanical oscillation resonance frequency $f_{C2}$.

* * * * *